(12) United States Patent
Keränen et al.

(10) Patent No.: US 12,574,154 B2
(45) Date of Patent: Mar. 10, 2026

(54) FIRST NODE, SECOND NODE, THIRD NODE, AND METHODS PERFORMED THEREBY FOR HANDLING RETRANSMISSIONS OF MESSAGES

(71) Applicant: Telefonaktiebolaget LM Ericsson (publ), Stockholm (SE)

(72) Inventors: Ari Keränen, Helsinki (FI); Anna Larmo, Espoo (FI); Petri Laari, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 17/908,217

(22) PCT Filed: Mar. 9, 2020

(86) PCT No.: PCT/SE2020/050254
§ 371 (c)(1),
(2) Date: Aug. 30, 2022

(87) PCT Pub. No.: WO2021/183014
PCT Pub. Date: Sep. 16, 2021

(65) Prior Publication Data
US 2023/0155734 A1 May 18, 2023

(51) Int. Cl.
*H04L 1/1607* (2023.01)
*H04W 52/02* (2009.01)

(52) U.S. Cl.
CPC ....... *H04L 1/1607* (2013.01); *H04W 52/0229* (2013.01)

(58) Field of Classification Search
CPC ....... H04L 1/1607; H04L 67/10; H04L 67/12; H04L 1/1864; H04W 52/0229;
(Continued)

(56) References Cited

U.S. PATENT DOCUMENTS 9,301,183 B2 * 3/2016 Heo .................. H04W 52/0235
2002/0080736 A1 * 6/2002 Furukawa ............... H04L 45/00
370/328
(Continued)

FOREIGN PATENT DOCUMENTS

EP 1494407 A1 1/2005
WO 2011159985 A1 12/2011
(Continued)

OTHER PUBLICATIONS

International Search Report and Written Opinion of the International Searching Authority for PCT International Application No. PCT/SE2020/050254 dated Jan. 27, 2021.

*Primary Examiner* — Kan Yuen
(74) *Attorney, Agent, or Firm* — Sage Patent Group

(57) ABSTRACT

A method performed by a first node. The first node operates in a communications network. The first node receives, from a second node operating in the communications network, an indication. The indication acknowledges receipt, by the second node or a fourth node operating in the communications network, of a message sent by the first node to a third node operating in the communications network. The first node refrains, before going into sleep mode, from waiting to receive from the third node one of: a) an acknowledgement of receipt of the sent message, and b) a request for retransmission of the sent message. The refraining is based on the received indication.

20 Claims, 10 Drawing Sheets

(58) Field of Classification Search
      CPC ......... H04W 52/0216; H04W 52/0219; H04W
                    4/70; H04W 52/0241; Y02D 30/70
      See application file for complete search history.

(56)                   References Cited

U.S. PATENT DOCUMENTS

| | | | |
|---|---|---|---|
| 2006/0098616 A1* | 5/2006 | Kish .................... | H04L 1/1607 |
| | | | 370/338 |
| 2010/0195665 A1* | 8/2010 | Jackson ................ | H04L 1/1607 |
| | | | 370/464 |
| 2016/0119894 A1* | 4/2016 | Patil .................... | H04W 8/005 |
| | | | 455/515 |
| 2016/0174220 A1* | 6/2016 | Patil .................... | H04W 68/005 |
| | | | 370/329 |
| 2017/0127341 A1* | 5/2017 | Di Marco ......... | H04W 52/0216 |
| 2017/0251469 A1* | 8/2017 | Lee .................. | H04W 72/0446 |
| 2021/0120372 A1* | 4/2021 | Kalhan ................ | H04W 28/02 |
| 2021/0127448 A1* | 4/2021 | Kadiri .............. | H04W 52/0209 |
| 2021/0195523 A1* | 6/2021 | Kim ................. | H04W 52/0241 |

FOREIGN PATENT DOCUMENTS

| | | | |
|---|---|---|---|
| WO | 2013107499 A1 | 7/2013 | |
| WO | 2016061399 A1 | 4/2016 | |

* cited by examiner a)

b)

c)

d)

e)

a)

b)

a)

b)

FIRST NODE, SECOND NODE, THIRD NODE, AND METHODS PERFORMED THEREBY FOR HANDLING RETRANSMISSIONS OF MESSAGES

CROSS REFERENCE TO RELATED APPLICATION

This application is a 35 U.S.C. § 371 national stage application of PCT International Application No. PCT/SE2020/050254 filed on Mar. 9, 2020, the disclosure and content of which is incorporated by reference herein in its entirety.

TECHNICAL FIELD

The present disclosure relates generally to a first node and methods performed thereby for handling retransmissions of messages. The present disclosure also relates generally to a second node, and methods performed thereby for handling retransmissions of messages. The present disclosure also relates generally to a third node, and methods performed thereby for handling retransmissions of messages.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network, wireless communication network, or telecommunications network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes. The telecommunications network covers a geographical area which may be divided into cell areas, each cell area being served by a network node, such as radio network node or Base Station (BS), which sometimes may be referred to as e.g., Transmission Point (TP), Radio Base Station (RBS), gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN.
Internet of Things (IoT)

The Internet of Things (IoT) may be understood as an internetworking of communication devices, e.g., physical devices, vehicles, which may also referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things" or devices, in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use Wi-Fi for remote monitoring. These devices may collect data with the help of various existing technologies and then autonomously flow the data between other devices.
Machine Type Communication (MTC)

Machine Type Communication (MTC) has, especially in the context of the Internet of Things (IoT), shown to be a growing market segment. An MTC device may be a communication device, typically a wireless communication device or simply wireless device, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone.

MTC involves communication in a wireless communication network to and/or from MTC devices, in which communication typically may be of quite different nature and with other requirements than communication associated with e.g. conventional mobile phones and smart phones. In the context of the IoT, it is evident that MTC traffic will be increasing and thus needs to be increasingly supported in wireless communication systems.
Constrained Application Protocol (CoAP)

Some of the devices that may make use of IoT or MTC may be considered constrained devices. A constrained device or constrained node may be understood as a node where some of the characteristics of Internet nodes may not be attainable, often due to cost constraints and/or physical constraints on characteristics such as size, weight, and available power and energy. For example, a constrained device may be a sensor in a car or in a building.

The Constrained Application Protocol (CoAP) may be understood as an example of a protocol designed for IoT applications in constrained nodes and constrained networks. CoAP may be understood to provide a request-response based Representational State Transfer (REST)-ful communication architecture between constrained nodes or between constrained nodes and nodes in the Internet. Hence, CoAP may be easily integrated to the web and web services by translating CoAP messages to HTTP. That is, CoAP may be considered to enable constrained devices to communicate with the wider Internet using similar protocols. CoAP may be understood as defined in RFC7252.

On current deployments, CoAP-based solutions like Open Mobile Alliance (OMA) like Lightweight Machine to Machine Protocol (LWM2M) are becoming increasingly popular in order to manage devices in a REST-based fashion.

OMA SpecWorks LwM2M protocol (http://www.open-mobilealliance.org/release/LightweightM2M/V1_1-20180612-C/OMA-TS-LightweightM2M_Core-V1_1-20180612-C.pdf) is a light and compact device management protocol that may be used for managing IoT devices and their resources. LwM2M may run on top of CoAP, which may either use User Datagram Protocol (UDP), Transmission Control Protocol (TCP), or Short Message Service (SMS) bindings. Hence, LwM2M may be understood to be compatible with any constrained device which may support CoAP.

LwM2M may define three components:

LwM2M Client: An LwM2M Client may contain several LwM2M objects with several resources. An LwM2M Server may execute commands on these resources to manage the client. The commands may be instructions such as to read, to delete or to update the resources. LwM2M Clients may generally be constrained devices.

LwM2M Server (Management Server): An LwM2M Server may manage LwM2M Clients by sending management commands to them.

LwM2M Bootstrap Server: An LwM2M Bootstrap Server may be used to manage the initial configuration parameters of LwM2M Clients during bootstrapping of the devices.

IoT devices use protocols such as CoAP to enable reliable end-to-end communication in networks that may have packet loss. CoAP may use confirmable (CON) messages for end-to-end reliability of CoAP messages. In this case, a CoAP client may send a message that may indicate a need for Acknowledgement (ACK), wait until an ACK is received, or keep on re-transmitting until a maximum number of retransmissions may be reached.

In radio access technologies such as 3GPP or IEEE802.11, the network may be understood to have full visibility to what messages, e.g., Internet Protocol (IP) packets are attempted to be sent by a UE, and which are successfully received by the radio access point when a retransmission protocol, e.g. Radio Link Control (RLC) protocol in 3GPP, is used with Acknowledged Mode (AM) enabled. The messages that are not successfully received by the radio access point may be re-transmitted on RLC until a maximum number of retransmissions is reached.

Also, other retransmission protocols exist in the 3GPP system such as Hybrid ARQ (HARQ) and Packet Data Convergence Protocol (PDCP).

The end-to-end reliability of CoAP, and other IoT protocols, may require the client to remain on, that is, transmitting and receiving, until an ACK is received from the other endpoint. Since the other endpoint may commonly be a server in the cloud, the time that may elapse until the CoAP ACK is received may be long, e.g., up to hundreds of milliseconds, or in case of packet loss, retransmissions by the UE may be required, which may again involve waiting with the power on for multiple seconds. Even if the radio module may sleep with discontinuous reception (DRX) features, this client on state consumes a considerable amount of power from the device.

SUMMARY

It is an object of embodiments herein to improve the handling of retransmissions in a communications network. It is a particular object of embodiments herein to improve the management of retransmissions by constrained devices in a communications network.

According to a first aspect of embodiments herein, the object is achieved by a method performed by a first node. The first node operates in a communications network. The first node receives, from a second node operating in the communications network, an indication. The indication acknowledges receipt, by the second node or a fourth node operating in the communications network, of a message. The message is sent by the first node to a third node operating in the communications network. The first node then refrains, before going into sleep mode, from waiting to receive from the third node one of: a) an acknowledgement of receipt of the sent message, and b) a request for retransmission of the sent message. The refraining is based on the received indication.

According to a second aspect of embodiments herein, the object is achieved by a method performed by the second node. The second node operates in the communications network. The second node facilitates sending a first message to the first node operating in the communications network. The first message indicates a capability of the second node or the fourth node operating in the communications network to keep custody of fourth messages to be sent from the first node to the third node operating in the communications network. The second node receives, after having sent the first message, a fourth message from the first node. The fourth message is addressed to the third node. The second node then handles the fourth message based on the indicated capability. According to a first option, with the proviso that the second node has the capability to keep custody of the fourth messages, the second node creates an electronic fingerprint uniquely identifying the received fourth message, and sends a third indication of the created electronic fingerprint to the third node. According to a second option, b) with the proviso that the fourth node has the capability to keep custody of the fourth messages, the second node forwards the received fourth message to the fourth node.

According to a third aspect of embodiments herein, the object is achieved by a method performed by the third node. The third node operates in the communications network. The third node receives a third indication from another node operating in the communications network. The third indication indicates an electronic fingerprint of a fourth message received or to be received from the first node operating in the communications network. The third node also determines, based on the received third indication, whether or not the fourth message has been received. The third node also sends a fifth message to one of: the another node and the first node, based on a result of the determination. The fifth message is one of an acknowledgement of receipt of the fourth message and a request for retransmission of the fourth message.

According to a fourth aspect of embodiments herein, the object is achieved by the first node, configured to operate in the communications network. The first node is configured to receive, from the second node configured to operate in the communications network, the indication configured to acknowledge receipt, by the second node or the fourth node configured to operate in the communications network, of the message configured to be sent by the first node to the third node configured to operate in the communications network. The first node is further configured to refrain, before going into sleep mode, from waiting to receive from the third node one of: a) the acknowledgement of receipt of the message configured to be sent, and b) the request for retransmission of the message configured to be sent. To refrain is configured to be based on the indication configured to be received.

According to a fifth aspect of embodiments herein, the object is achieved by the second node, configured to operate in the communications network. The second node is configured to facilitate sending the first message to the first node configured to operate in the communications network. The first message is configured to indicate the capability of the second node or the fourth node configured to operate in the communications network to keep custody of the fourth messages configured to be to be sent from the first node to the third node configured to operate in the communications network. The second node is further configured to receive, after having sent the first message, the fourth message from the first node. The fourth message is configured to be addressed to the third node. The second node is further configured to handle the fourth message based on the capability configured to be indicated. According to a first option, with the proviso that the second node is configured to have the capability to keep custody of the fourth messages, the second node is further configured to create the electronic fingerprint uniquely identifying the received fourth message. The second node is also configured to send the third indication of the electronic fingerprint configured to be created to the third node. According to a second option, with the proviso that the fourth node is configured to have the capability to keep custody of the fourth messages, the second node is further configured to forward the fourth message configured to be received to the fourth node.

According to a sixth aspect of embodiments herein, the object is achieved by the third node, configured to operate in the communications network. The third node is configured to receive the third indication from another node configured to operate in the communications network. The third indication is configured to indicate the electronic fingerprint of the fourth message configured to be received from the first node configured to operate in the communications network. The third node is further configured to determine, based on the third indication configured to be received, whether or not the fourth message has been received. The third node is configured to send the fifth message to one of: the another node and the first node, based on the result of the determination. The fifth message is configured to be one of the acknowledgement of receipt of the fourth message and the request for retransmission of the fourth message.

By the first node refraining from waiting to receive the acknowledgement of receipt or a request for retransmission from the third node before going into sleep mode, the first node is enabled to save energy. This is because the first node is enabled to go to sleep immediately after receiving acknowledgement from the second node or the fourth node.

Therefore, the time the first node may need to stay awake before it may receive the acknowledgement of receipt or the request for retransmission from either the second node or the fourth node may be understood to be shorter than if the first node had to wait to receive the acknowledgement of receipt or the request for retransmission from the third node, which may be understood to be at least one more hop away. If the third node is more than one hop away or in the cloud, the time may be considerably shortened by embodiments herein.

By the second node facilitating the indication to the first node of its capability, or that of the fourth node, and handling the fourth message based on the indicated capability, the second node enables the first node to refrain from waiting to receive the acknowledgement of receipt or the request for retransmission from the third node before going into sleep mode, as the second node has the capability to keep custody of the fourth messages to be sent from the first node to the third node.

By the third node receiving the electronic fingerprint of the fourth message received or to be received from the first node from the another node, e.g., the second node or the fourth node, the third node is enabled to determine whether or not the fourth message has been received, and acknowledge receipt or request retransmission of the fourth message to or from the another node, instead of to or from the first node. Hence the third node also enables the first node to refrain from waiting to receive the acknowledgement of receipt or a request for retransmission from the third node before going into sleep mode as the another node has the capability to keep custody of fourth messages to be sent from the first node to the third node, and the third node acts accordingly.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a number of problems with existing methods will first be identified and discussed.

Several embodiments are comprised herein, which address the limitations of the existing methods. As an overview, embodiments herein may be understood to be drawn to methods and apparatus for network-assisted re-transmissions of messages comprising e.g., IoT Data.

As a general summary of embodiments herein with an illustrative example, embodiments herein describe a method whereby a radio access point, e.g., an eNB or an IEEE802.11 access point, may keep track of all the messages that may be sent by a device. The access point may create an electronic fingerprint of all the messages, e.g., comprising application layer payloads, using e.g., a hash function, and may option-ally store the contents. When the radio access point acknowledges (ACKs) the reception of the message, the device may go immediately to sleep mode without having to wait for ACK from the other endpoint.

Storage of content and hash function results may be either in the access point or in another network entity the access point may have a signaling relationship with.

The cloud server, that is, the other endpoint, may sub-scribe to notifications of this information, or query it peri-odically, and/or when triggered by some event. The cloud server may compare the electronic fingerprints of the received messages to the electronic fingerprints of the mes-sages the radio access point may report that may have been sent by the device towards the server. When the cloud server notices that the device has sent a message it has never received, the server may query the radio access point and/or storage node for the contents of the message, if it was stored, or ask the device to re-transmit the message the next time it is awake. In the latter case, the device may also need to store the delivered data for a certain period of time, just in case a retransmission may be required.

Additional mechanisms may be used to allow the radio access point to discard the stored electronic fingerprints when a notification may be received from the cloud server or after a predefined time. A common retransmission win-dow mechanism may be implemented for this as long as an acknowledgement scheme may be in place between the cloud server and the radio access point.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Figure 1:
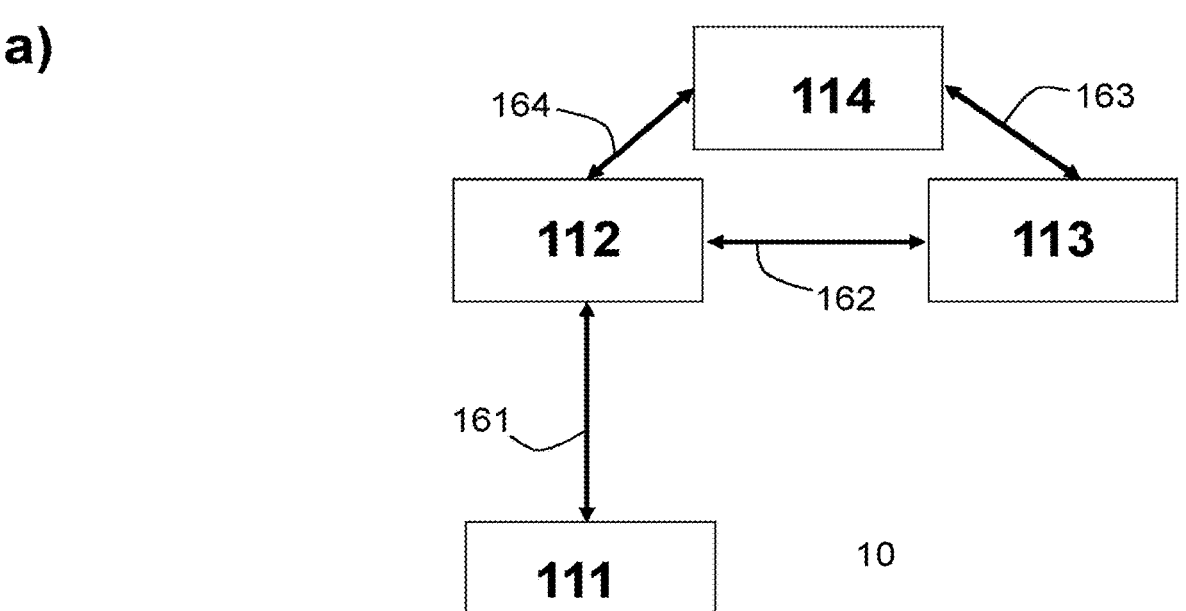
FIG. 1 is a schematic diagram illustrating five non-limiting examples in panels a), b), c), d), and e), respectively, of a communications network, according to embodiments herein.
Figure 1:
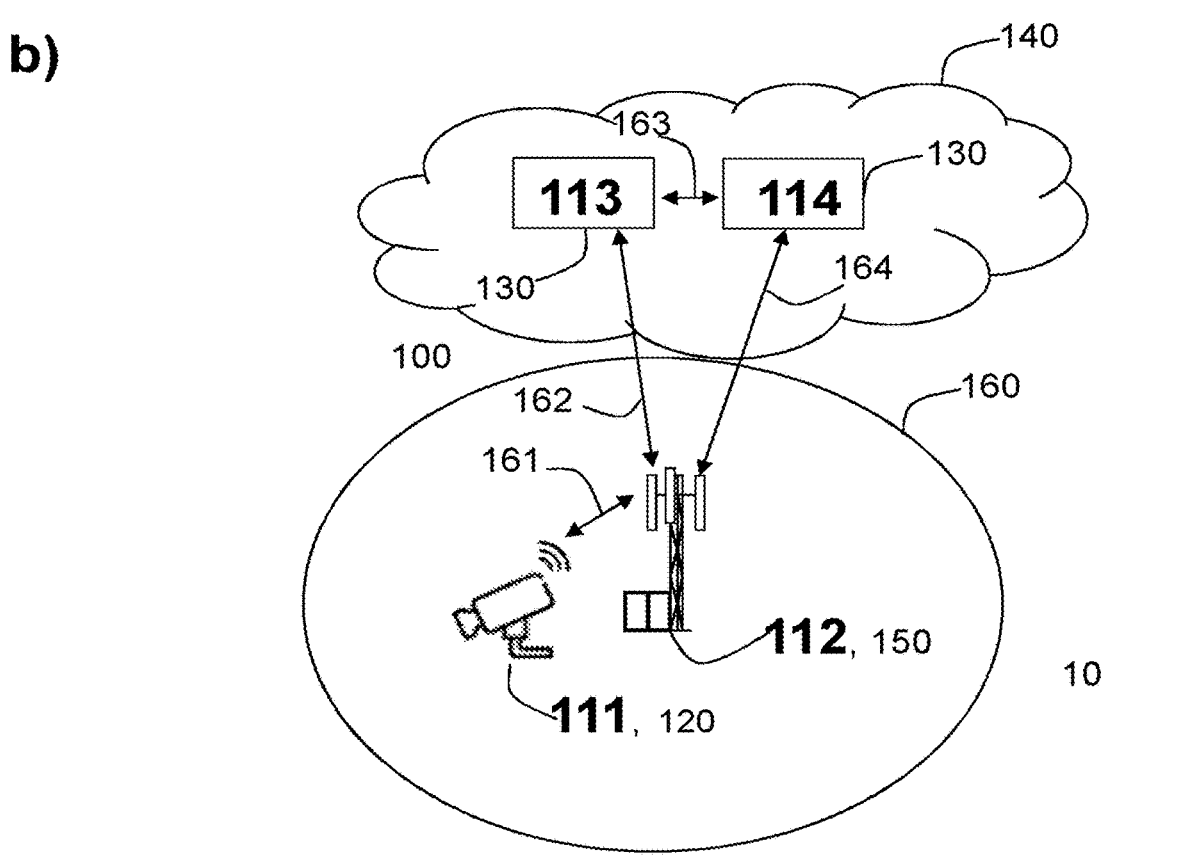
Figure 1:
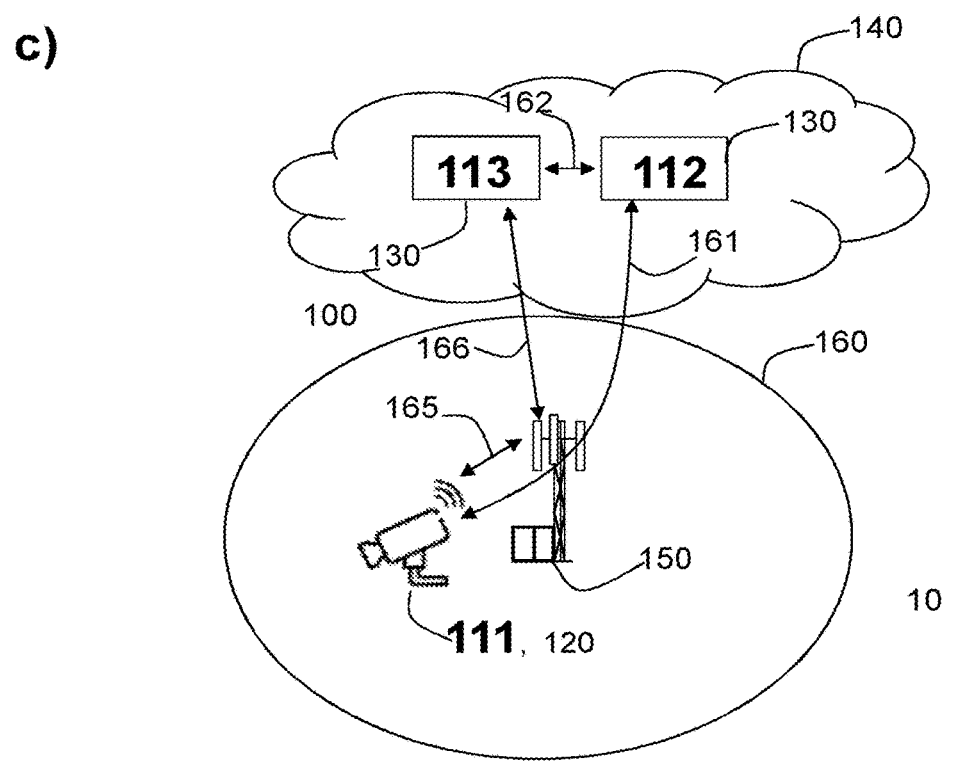
Figure 1:
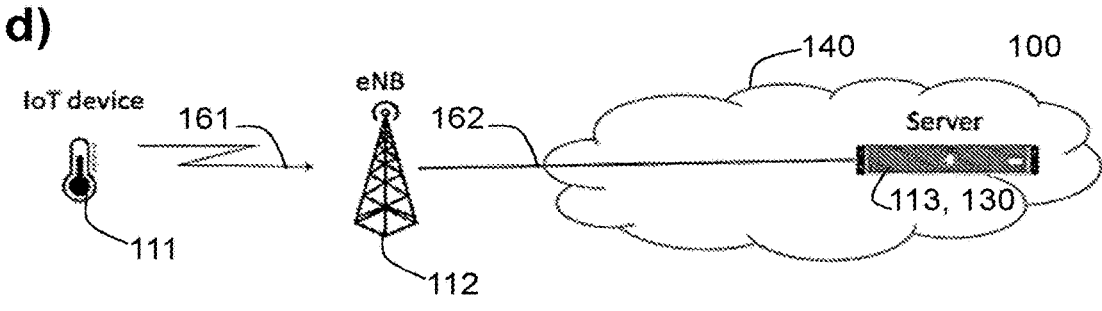
Figure 1:
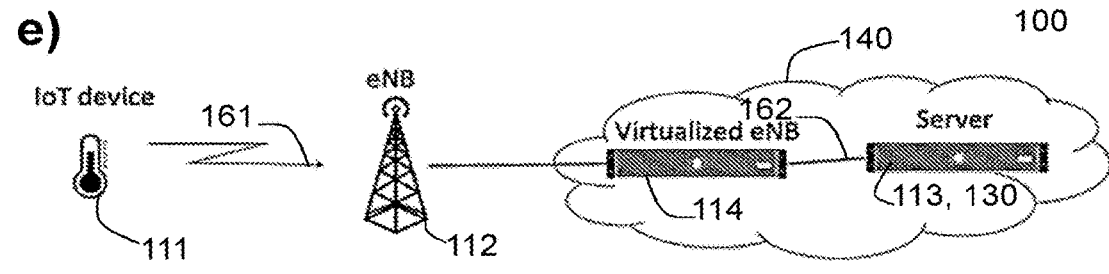

FIG. 1 depicts five non-limiting examples, in panels "a", "b", "c", "d" and "e" respectively, of a communications network 10, in which embodiments herein may be imple-mented. In some example implementations, such as that depicted in the non-limiting example of FIG. 1*a*), the communications network 10 may be a computer network, e.g., a wired computer network. In other example imple-mentations, such as that depicted in the non-limiting examples of FIGS. 1*b*), *c*), *d*) and *e*), the communications network 10 may be implemented in a wireless communica-tions network 100, sometimes also referred to as a wireless network, that could be a telecommunications or a cellular radio system, cellular network or other wireless communi-cations system. In some examples, the wireless communi-cations network 100 may comprise network nodes which may serve receiving nodes, such as wireless devices, with serving beams.

The wireless communications network 100 may support different radio technologies, such as 3GPP NR, Wi-Fi based on IEEE802.11 or another radio technology that may use retransmission protocols over the air interface. The wireless communications network 100 may for example be an IoT network, a Narrow-Band IoT (NB-IoT) network, a Category M1 (CATM) network, a Global System for Mobile commu-nications (GSM) network, or another Internet service pro-vider (ISP)-oriented network.

In some examples, the communications network 10, or the wireless communications network 100 may for example be a network such as 5G system, or Next Gen network. The wireless communications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network com-prising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 10 comprises a plurality of nodes, whereof a first node 111, a second node 112, a third node 113, and a fourth node 114 are depicted in FIG. 1. Each of the first node 111, the second node 112, the third node 113 and the fourth node 114 may be understood as a computer system. In descriptions relating to the third node 113, the term another node 112,114 may refer to any of the second node 112 or the fourth node 114. In descriptions relating to the second node 112, another node 114 may refer to the fourth node 114.

The first node 111 may be a device, such as the device 120 depicted in FIG. 1. The device 120 may be a UE or a Customer Premises Equipment (CPE) which may be under-stood to be enabled to communicate data, with another entity, such as a server, a laptop, a Machine-to-Machine (M2M) device, device equipped with a wireless interface, or any other radio network unit capable of communicating over a wired or radio link in a communications system such as the communications network 10. In some embodiments, the device 120 may be understood to be an IoT device in e.g., an IoT network, for example, a constrained device. In some particular embodiments, the device 120 may be understood to be a constrained device operating on LWM2M. The device 120 may run a client application, which may be enabled to communicate with a host application run by the third node 113. The device 120 may support operation on CoAP.

The device 120 may be a wireless device comprised in the communications network 10, such as a Bluetooth Low Energy (BLE) User Equipment (UE). The device 120 may be enabled to communicate wirelessly in the communica-tions network 10 and, in some particular examples, may be able support beamforming transmission. The communication may be performed e.g., via a RAN and possibly one or more core networks, comprised within the communications network 10.

The device 120 may be also e.g., a mobile terminal, wireless terminal and/or mobile station, mobile telephone, cellular telephone, or laptop, just to mention some further examples. The device 120 may be, for example, portable, pocket-storable, hand-held, computer-comprised, a sensor, camera, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles or any other radio network unit capable of communicating over a wired or radio link in the communications network 10. The communications network 10 may comprise other communication devices.

Any of the second node 112, the third node 113 and the fourth node 114 may be a network node 130. The network node 130 may be implemented, as depicted in the non-limiting example of FIGS. 1b)-1e), and as a standalone server in e.g., a host computer in the cloud 140. The network node 130 may in some examples be a distributed node or distributed server, with some of its functions being implemented locally, e.g., by a client manager, and some of its functions implemented in the cloud 140, by e.g., a server manager. Yet in other examples, the network node 130 may also be implemented as processing resources in a server farm. The network node 130 may be under the ownership or control of a service provider, or may be operated by the service provider or on behalf of the service provider.

In typical examples such as that shown in FIGS. 1 b) and d)-e), the second node 112 may be a radio network node such as the radio network node 150 described below. In other examples such as that shown in FIG. 1 c), the second node 112 may be a network node such as the network node 130 just described, which may be, e.g., in the cloud 140. In the particular example of FIG. 1 e), the second node 112 may be a radio network node such as the radio network node 150 described below, which in this example, has some of its functions being implemented locally, e.g., by a client manager in a base station, and some of its functions implemented in the cloud 140, by the fourth node 114, e.g., a server manager. In this particular example, the fourth node 114 is a virtualized eNB working as a distributed node together with the second node 112.

The radio network node 150 may be a transmission point such as a radio base station, for example a gNodeB, an eNodeB, or a Home Node B, a Home eNode B or any other network node capable to serve a wireless device, such as the device 120 in the communications network 10. The radio network node 150 may be of different classes, such as, e.g., macro eNodeB, home eNodeB or pico base station, based on transmission power and thereby also cell size. In some examples, the radio network node may serve receiving nodes with serving beams. The radio network node 150 may support one or several communication technologies, and its name may depend on the technology and terminology used. Any of the radio network nodes that may be comprised in the communications network 10 may be directly connected to one or more core networks. The wireless communications network 100 may cover a geographical area which, which in some embodiments may be divided into cell areas, wherein each cell area may be served by a radio network node such as the radio network node 150, although, one radio network node may serve one or several cells. In the example of FIG. 1b) and c), the radio network node 150 serves a cell 160.

In typical examples, the third node 113 may be a server. The third node 113, may be a server in the cloud 140, e.g., a LwM2M server in the cloud 140, as depicted in the examples of FIGS. 1b)-e).

In typical examples, the fourth node 114 may be another network node, such as the network node 130, in the cloud 140. In some examples, such as that depicted in FIG. 1c), the second node 112 and the fourth node 114 may the co-localized or be the same node. In typical examples, the second node 112, the third node 113 and the fourth node 114 may be different nodes.

Any of the second node 112, the third node 113 and the fourth node 114 may have a capability to communicate with communication devices being constrained devices. Any of the first node 111, the second node 112, the third node 113 and the fourth node 114 may be enabled to operate using a Lightweight Machine to Machine protocol (LwM2M). If the third node 113 is a LwM2M Management Server, it may be convenient to use, for the signalling between the second node 112 and third node 113, the LwM2M protocol.

In some examples, any of the first node 111, the second node 112, the third node 113 and the fourth node 114 may support operation on the CoAP protocol. However, it may be understood that while embodiments herein have been described to work with CoAP, they may also be extended to other protocols.

The first node 111 is configured to communicate within the communications network 10 with the second node 112 over a first link 161. The second node 112 is configured to communicate within the communications network 10 with the third node 113 over a second link 162. The third node 113 is configured to communicate within the communications network 10 with the fourth node 114 over a third link 163. The second node 112 is configured to communicate within the communications network 10 with the fourth node 114 over a fourth link 164. The wireless device 130 may be configured to communicate within the communications network 10 with the radio network node 150 over a fifth link 165, e.g., a radio link. The radio network node 150 may be configured to communicate within the communications network 10 with the third node 113 over a sixth link 166, e.g., a radio link.

Any of the first link 161, the second link 162, the third link 163, the fourth link 164 and the sixth link 166 may be, e.g., a radio link, an infrared link, or a wired link. Any of the first link 161, the second link 162, the third link 163, the fourth link 164, the fifth link 165 and the sixth link 166 may be comprised of a plurality of individual links.

Any of the first link 161, the second link 162, the third link 163, the fourth link 164 and the sixth link 166 may be a direct link or it may go via one or more computer systems or one or more core networks in the communications network 10, which are not depicted in FIG. 1, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In the examples of Figures d) and e), the first node 111 is an IoT device, the second node 112 is an eNB, and the third node 113 is a server in the cloud 140. In panel e), the second node 112 is a distributed radio network node between the base station 112*a* and the server 112*b*.

In general, the usage of "first", "second", "third", "fourth", "fifth", "sixth", etc. herein may be understood to be an arbitrary way to denote different elements or entities, and may be understood to not confer a cumulative or chronological character to the nouns they modify.

Figure 2:
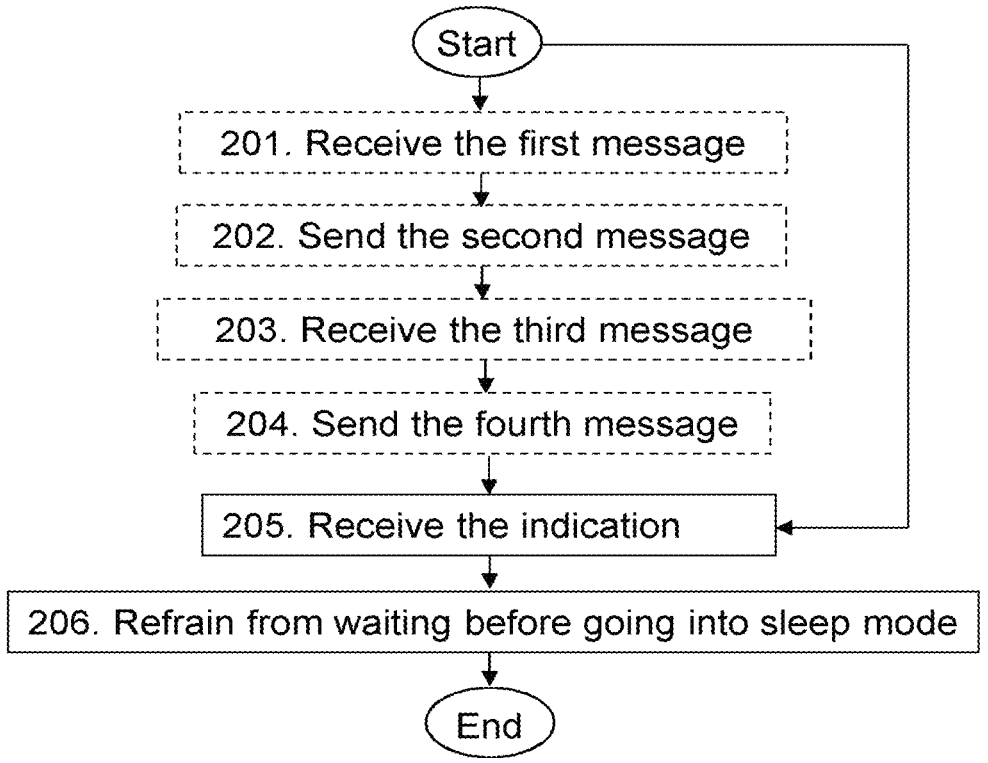
FIG. 2 is a flowchart depicting embodiments of a method in a first node, according to embodiments herein.

Embodiments of method performed by the first node 111 will now be described with reference to the flowchart depicted in FIG. 2. The method may be understood to be for handling retransmissions of messages. The first node 111 may be understood to be operating in the communications network 10. In some embodiments, the communications network 10 may operate on a LwM2M technology.

In some embodiments, the first node 111 may be the device 120, the second node 112 may be the radio network node 150 serving the device 120, the third node 113 may be the network node 130 in the cloud 125, and the fourth node 114 may be another network node in the communications network 10. The first node 111 may be, for example, an LwM2M client. The third node 113 may be an LwM2M server.

The method may comprise the actions described below. Several embodiments are comprised herein. In some embodiments, some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 2, optional actions are indicated with dashed boxes.

Action 201

The first node 111 may be understood to be enabled to transmit messages, e.g., data, to the third node 113 via a radio access point such as the second node 112, the first node 111 may be understood to be connected to, as depicted for example in FIG. 1*b*), or 1*d*)-1*e*). The first node 111, which may be a constrained device may, in order to save energy, enter the sleep mode after sending a message to the third node 113. The first node 111 may typically wake up only when a new packet may need to be transmitted, or when a sleep timer may go off. For example, there may be different sleep timers in the Medium Access Control (MAC) layer that may wake up the first node 111 to check for download data. When the first node 111 is transmitting messages, it may wait for a confirmation that the data packet has been delivered, e.g., an acknowledgement (ACK).

The latency between the Radio Link Control ACK (RLC: ACK) and the data message reception by the third node 113 may vary significantly. If the third node 113 is in the cloud 140, the latency may easily be several hundreds of milliseconds depending on what kind of path may be taken from the RAN to the cloud 140, that is, how many hops may have to be crossed, and what kind of links, etc. A further latency adding factor may be understood to be the cloud 140 processing itself, which may easily also contribute hundreds of ms. The first node 111, e.g., an IoT device, may therefore consume a lot of energy when waiting for radio signals. According to embodiments herein, the waiting time may be considerably shortened by delegating the management of any potential retransmissions, or acknowledgements of receipt of the messages that may be sent to the third node 113. The first node 111 may delegate the management of the retransmissions, or acknowledgements of receipt of the messages to another node in the communications network 10 having the capability to act as custodian of the messages. To act as custodian may be understood to mean to store information about messages sent, until an acknowledgement of receipt may be received from the destination, here, the third node 113. Information stored may consist of the full message or, as will be explained later, only an electronic fingerprint of the message. If messages are stored, the acting custodian may re-transmit the stored messages in case of receipt of a request for retransmission from the third node 113. If only the electronic fingerprint is stored, the custodian may only inform about the messages that may have been sent.

Such a custodian node may be, e.g., the next hop node, which in embodiments herein may be understood to be the second node 112, e.g., an eNB or a gNB. This way, after receiving an acknowledgement of receipt from the custodian node, the first node 111 may go to sleep. Since the second node 112 may be at least one hop closer to the first node 111 than the third node 113, and may even be the next hop node, the waiting time for the first node 111 may therefore be understood to be shortened, which represents savings in the energy used.

The messages, e.g., data packets, may not necessarily be stored in the second node 111, e.g., an access point, itself. They may instead be stored close to the second node 112. For example, the messages, the data packets, or even hash results, may be stored in the fourth node 114, e.g., another node on path, e.g., a Packet Data Network Gateway (PGW), or even off-path node if transmission overhead is acceptable. The fourth node 114 may be e.g., an edge node. This may be particularly implemented when storage constraints near the second node 112 may be a problem.

In order to enable the first node 111 to take advantage of this delegation, the first node 111 may be understood to need to know that the second node 112 or the fourth node 114 may be able to act as custodians of the messages to be sent to the third node 113. These messages, may also be referred to herein as "fourth messages". The fourth messages may be understood herein as any kind of messages the first node 111 may send to the third node 113, e.g., in a future time period. The fourth messages may be e.g., LWM2M notification messages with a measurement value from the first node 111. The fourth messages may be radio technology specific.

According to the foregoing, in this Action 201, the first node 111 may receive a first message from the second node 112. The first message may indicate a capability of the second node 112, or the fourth node 114, to keep custody of fourth messages to be sent from the first node 111 to the third node 113.

The receiving, e.g., obtaining, in this Action 201 may be performed, e.g., via the first link 161.

The first message may be, for example, a Radio Resource Configuration (RRC) message configuring this action, a NAS message, a LWM2M message, an IPv6 Router Advertisement (RA), a Dynamic Host Configuration Protocol (DHCP) message, etc.

By receiving the first message in this Action 201, the first node 111 may learn that the first node 111, or the fourth node 114, may be able to store the fourth messages themselves, and that therefore, the first node 111 may delegate the management of the retransmissions, or acknowledgements of receipt of the messages to the first node 111 or the fourth node 114, instead of the first node 111 itself performing this management itself. Hence, the first node 111 may be enabled to know that for the future transmissions of the fourth messages to the third node 113, the first node 111 may need to only wait to receive the acknowledgement of receipt from the second node 112, and may then be able to go to sleep without having to stay awake and wait to receive an acknowledgement or a request for retransmission from the third node 113.

Action 202

Once the first node 111 may have learnt that the second node 112 or the fourth node 114 may act as custodians, it may notify the third node 113 about this, so that the third node 113 is enabled to know that any acknowledgements or requests for retransmission of the fourth messages may need to be sent to the second node 112 or the fourth node 114 instead. It may also be that the first node 111 may detect this capability and may then wait for the third node 113 to ask if such capability exists.

Accordingly, in this Action 202, the first node 111 may send, based on the received first message, a second message to the third node 113. The second message may comprise a first indication indicating the capability of the second node 112 or the fourth node 114 to have custody of fourth messages to be sent from the first node 111 to the third node 113.

The sending, e.g., providing, in this Action 202 may be performed, e.g., via the first link 161.

The second message may be, for example, an LwM2M message sent by the first node 111 in response to request from the third node 113, e.g., a LwM2M Management Server (MS), or as part of a registration to the third node 113, or an acknowledgement of the configuration in RRC, or NAS.

The first indication may be, for example, a value of a LwM2M management object resource delivered as part of a response or attribute indicated in LwM2M registration.

Action 203

In order to enable the first node 111 to take advantage of the delegation described above, the first node 111 may be understood to also need to know that the third node 113 may be able to communicate its requests for retransmissions, or acknowledgements of receipt of the fourth messages to the custodians of the messages instead of to the first node 111. Accordingly in this Action 203, the first node 111 may receive, in response to the sent second message, a third message from the third node 113. The third message may indicate whether or not the third node 113 supports the indicated custody service.

The receiving, e.g., obtaining, in this Action 201 may be performed, e.g., via the first link 161.

The third message may be, for example, an acknowledgement of the LwM2M registration message, or a LwM2M write command enabling the custody feature in the first node 111.

Once the first node 111 may have confirmation from the third node 113 that the third node 113 supports the indicated custody service, it may then be ready to delegate the management of the retransmissions, or acknowledgements of receipt of the fourth messages onto the second node 112 and/or the fourth node 114.

Action 204

The first node 111, in this Action 204, may send, after receipt of the third message indicating that the third node 113 supports the indicated custody service, a message to the third node 113 via the second node 112 or the fourth node 114. The message may be a fourth message as described earlier.

In examples wherein the second node 112 may act as custodian itself, the first node 111 may send the fourth message to the third node 113 via the second node 112, e.g., as in the scenario of FIG. 1d).

In examples wherein the second node 112 may act as custodian with the assistance of the fourth node 114, or wherein the fourth node 114 may act as custodian itself, the first node 111 may send the fourth message to the third node 113 via the second node 112 and the fourth node 114, e.g., as in the scenario of FIG. 1b).

In some embodiments, the first node 111 may indicate high-priority messages that may need to be stored by the second node 112 or the fourth node 114. Accordingly, the first node 111 may further send, to the second node 112, a second indication of a priority of the sent fourth message. In typical examples, the second indication may be comprised in the fourth message. The second indication may be e.g., one or more Differentiated Services Code Point (DSCP) markings, an IPv6 flow IDentifier (ID) or User Datagram Protocol (UDP), Transmission Control Protocol (TCP), Stream Control Transmission Protocol (SCTP) port numbers.

The sending, in this Action 204 may be performed over e.g., the first link 161.

Action 205

In this Action 205, the first node 111 may receive, from the second node 112 operating in the communications network 10, an indication acknowledging receipt, by the second node 112 or the fourth node 114 operating in the communications network 10, of the message, that is, the fourth message, sent by the first node 111 to the third node 113 operating in the communications network 10.

The indication may be, e.g., an Radio Link Control (RLC) Acknowledgement message. With 3GPP technologies, the RLC acknowledge messages may be used; with 802.11 the ACK control message may be used.

In examples wherein the second node 112 may act as custodian itself, the indication acknowledging receipt may be received from the second node 112, e.g., as in the scenario of FIG. 1d).

In examples wherein the second node 112 may act as custodian with the assistance of the fourth node 114, or wherein the fourth node 114 may act as custodian itself, the second node 112 may refrain from sending the ACK until the fourth node 114 may have ACKed the reception of the message. Alternatively, the second node 112 may ACK immediately, but ensure the message is reliably delivered to the fourth node 114.

The receiving, e.g., obtaining, in this Action 201 may be performed, e.g., via the first link 161.

Action 206

After receiving the indication acknowledging receipt in Action 205, the first node 111 may go into sleep mode and save energy. That is, the first node 111, in this Action 206, may refrain, before going into sleep mode, from waiting to receive from the third node 113 one of: a) an acknowledgement of receipt of the sent message, that is, the fourth message, and b) a request for retransmission of the sent message. The refraining in this Action 206 is based on the received indication in Action 205.

By refraining from waiting to receive the acknowledgement of receipt or a request for retransmission from the third node 113 in this Action 206, before going into sleep mode, the first node 111 is enabled to save energy, by being enabled to sleep immediately after sending the fourth message and receiving acknowledgement from the second node 112, or the fourth node 114, which may be understood to be located at least one hop closer to the first node 111 than the third node 113. Therefore, the time the first node 111 may need to stay awake before it may receive the acknowledgement of receipt or the request for retransmission from either the second node 112 or the fourth node 114 may be understood to be considerably shorter than if the first node 111 had to wait to receive the acknowledgement of receipt or the request for retransmission from the third node 113. This may be particularly relevant in embodiments wherein the second node 112 is the radio network node 150 serving the first node 111 and the third node 113 is located in the cloud 140.

Figure 3:
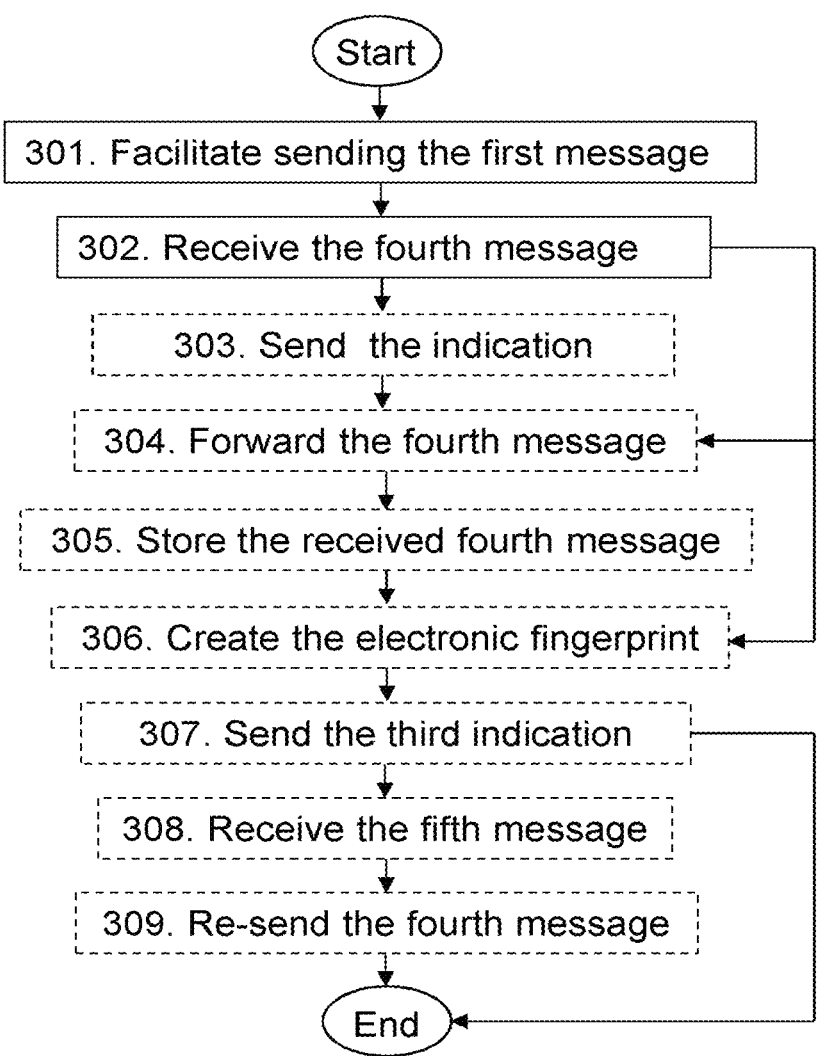
FIG. 3 is a flowchart depicting embodiments of a method in a second node, according to embodiments herein.

Embodiments of a method performed by the second node 112, will now be described with reference to the flowchart depicted in FIG. 3. The method may be understood to be for handling retransmissions of messages. The third node 113 may be understood to be operating in the communications network 10. In some embodiments, the communications network 10 may operate on a LwM2M technology.

In some embodiments, the second node 112 may be one of the radio network node 150 serving the device 120 and a fourth node 114 in the communications network 10, the third node 113 may be the network node 130 in the cloud 140, and the first node 111 may be the device 120.

The method may comprise one or more of the following actions. Several embodiments are comprised herein. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

The detailed description of some of the following corresponds to the same references provided above, in relation to the actions described for the first node 111, and will thus not be repeated here to simplify the description. For example, the third node 113 may be, for example, an LwM2M server, the first node 111 may be an LwM2M client, and the second node 112 may be the radio network node 150.

Action 301

In this Action 301, the second node 112 facilitates sending the first message to the first node 111 operating in the communications network 10. The first message indicates the capability of the second node 112 or the fourth node 114 operating in the communications network 10 to keep custody of the fourth messages to be sent from the first node 111 to the third node 113 operating in the communications network 10.

To facilitate sending in this Action 301 may be understood as to send or provide by the second node 112 itself, or as to enable or to trigger another node to send the first message. In the latter case, the second node 112 may then, e.g., communicate its capability to the other node, implicitly or explicitly.

The second node 112 may facilitate sending the first message for example, in the early phase of the communication e.g. as a parameter added to the connection initialization. Alternatively, the second node 112 may facilitate the sending of the first message in response to a request from the first node 111.

The sending in this Action 301 may be performed, e.g., via the first link 161.

Action 302

In this Action 302, the second node 112 may receive, after having facilitated the sending of the first message, the fourth message from the first node 111. The fourth message may be understood to be addressed to the third node 113.

The receiving in this Action 302 may be performed, e.g., via the first link 161.

In some embodiments, the receiving in this Action 302 may further comprise receiving a plurality of fourth messages.

In some embodiments, the second node 112 may further receive, from the first node 111, the second indication of the priority of the received fourth message. The second indication may for example indicate whether the fourth message is critical, or non-critical. For example, if the LwM2M protocol is used, information of the exchanged LwM2M objects between the first node 111 and third node 113 may be used by the second node 112 to determine the criticality of the data.

Action 303

The second node 112, in this Action 303, may send the indication to the first node 111 acknowledging receipt of the fourth message by the second node 112.

The sending in this Action 303 may be performed over e.g., the first link 161.

In some examples, all RLC Acknowledgement messages may be sent by the second node 112 to ensure reliable communication between the first node 111 and second node Action 304

In this Action 304, the second node 112 may forward the received fourth message to the third node 113 and/or the fourth node 114.

After the second node 112 has received the fourth message, the second node 112 handles the fourth message based on the indicated capability. With the proviso that the fourth node 114 has the capability to keep custody of the fourth messages, in this Action 304, the second node 112 forwards the received fourth message to the fourth node 114.

In embodiments wherein the second node 112 may have the capability to keep custody of the fourth messages, in this Action 304, the second node 112 may forward the received fourth message to the third node 113.

The forwarding, e.g., sending, in this Action 304 may be performed, e.g., via the fourth link 164.

Action 305

In embodiments wherein the second node 112 may have the capability to keep custody of the fourth messages, in this Action 305, the second node 112 may store the received fourth message.

By storing the fourth message on the second node 112, if the fourth message goes missing and is not received by the third node 113, the second node 112 may be enabled to resend the fourth message to the third node 113 without contacting the first node 111, and having to wake it up.

Although there is no size limit to the fourth message, the fourth message which may comprise IoT data, may typically be very small, e.g., tens of bytes. Therefore, the requirements on the storage size may be understood to be relatively small. In examples wherein the second node 112 may be the fourth node 114, and the fourth node 114 may be an edge node, considering the amount of data stored and the memory requirements on edge nodes, the storage of the fourth messages may be understood to be easily managed.

If the fourth message is not critical, the second node 112 may not store it.

Action 306

As stated earlier, after the second node 112 has received the fourth message, the second node 112 handles the fourth message based on the indicated capability. With the proviso that the second node 112 has the capability to keep custody of the fourth messages, the second node 112, in this Action 306, creates an electronic fingerprint uniquely identifying the received fourth message.

The electronic fingerprint may be e.g., a hash function over the application payload, since the Internet Protocol (IP) and transport information may change due to Network Address Translators (NATs).

The second node 112 may therefore create the electronic fingerprint by selecting the hash function. The hash function may be selected based on configurable requirements, e.g., speed of the algorithm, electronic fingerprint size, output size, or security features. The hash function may be for example, SHA-256.

In some embodiments, the creating in this Action 306 of the electronic fingerprint may be further based on the indicated priority. For example, the second node 112 may ignore low-priority messages altogether.

In some of the embodiments wherein the receiving in Action 302 may have further comprised receiving the plurality of fourth messages, the creating in this Action 306 may further comprise creating a plurality of electronic fingerprints. Each of the electronic fingerprints in the plurality may uniquely identify a respective message in the plurality of received fourth messages.

The second node 112 may create an electronic fingerprint of each fourth message, or for each configured set of fourth messages that may be sent by the first node 111, for example, categorized by receiver.

The second node 112 may be understood to not have to be able to decrypt the traffic received from the first node 111, but it may be able to create the electronic fingerprints on encrypted fourth messages, e.g., data packets.

Action 307

With the proviso that the second node 112 has the capability to keep custody of the fourth messages, the second node 112, in this Action 307, sends a third indication of the created electronic fingerprint to the third node 113.

The sending, e.g., a push action, in this Action 307 may be performed over e.g., the second link 162.

The electronic fingerprints may be exchanged with a new protocol or an extension to an existing protocol/data model, e.g., LwM2M.

In some embodiments, the third indication may indicate the plurality of created respective electronic fingerprints. That is, the third indication may comprise a list of electronic fingerprints.

In some particular embodiments, the third indication may comprise a respective third indication for each of the created respective electronic fingerprints.

Action 308

In some embodiments, in this Action 308, the second node 112 may receive the fifth message from the third node 113. The fifth message may be a request for retransmission of the fourth message from the first node 111. The request may identify the forwarded message based on the sent third indication.

This Action 308 may be performed in embodiments wherein the second node 112 may have the capability to keep custody of the fourth messages.

The receiving, in this Action 308 may be performed, e.g., via the second link 162.

If the data comprised in the fourth message is not critical, the second node 112 may not have stored the data itself, only the electronic fingerprints. Therefore, in such instances, the fifth message, if it is a resend request, may need to be forwarded by the second node 112 all the way to the first node 111 when the first node 111 may be away, that is, not sleeping. In such examples, the first node 111 may need to store the data for a certain time, together with the hash-value.

In other embodiments, the fifth message may be an acknowledgement of receipt of the fourth message from the first node 111.

Action 309

In embodiments wherein the second node 112 may have the capability to keep custody of the fourth messages, in this Action 309, the second node 112 may re-send the fourth message to the third node 113, based on the received fifth message.

The re-sending, in this Action 309 may be performed, e.g., via the second link 162. The second node 112 may use any of the defined re-sending mechanisms to re-deliver the fourth message to the third node 113.

The second node 112 may then discard the fourth messages that it may have stored, and that were not requested by the third node 113, assuming that the third node 113 successfully received them.

Figure 4:
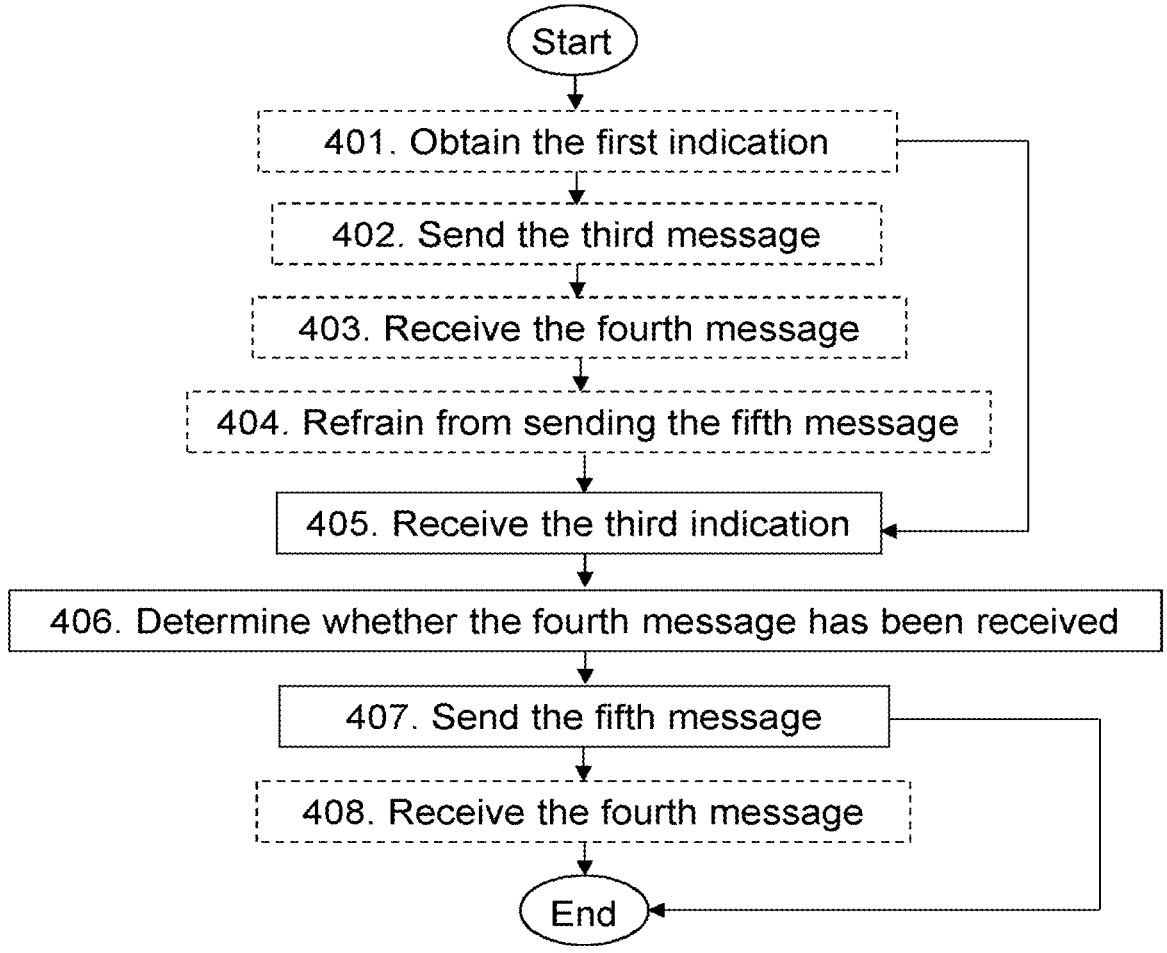
FIG. 4 is a flowchart depicting an example of a method in a third node, according to embodiments herein.

Embodiments of a method performed by the third node 113, will now be described with reference to the flowchart depicted in FIG. 4. The method may be understood to be for handling retransmissions of messages. The third node 113 may be understood to operate in the communications network 10. In some embodiments, the communications network 10 may operate on a LwM2M technology.

In some embodiments, the third node 113 may be the network node 130 in the cloud 140, the first node 111 may be the device 120, and the another node 112, 114 may be one of: the second node 112, e.g., the radio network node 150 serving the device 120, and the fourth node 114 in the communications network 10.

The method may comprise one or more of the following actions. Several embodiments are comprised herein. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed boxes.

The detailed description of some of the following corresponds to the same references provided above, in relation to the actions described for the first node 111 or the second node 112, and will thus not be repeated here to simplify the description. For example, the third node 113 may be an LwM2M server, and the first node 111 may be an LwM2M client.

Action 401

In this Action 401, the third node 113 obtains the first indication indicating the capability of the another node 112, 114 to have custody of fourth messages to be sent from the first node 111 to the third node 113.

Obtaining in this Action 401 may be understood as, e.g., retrieving from a memory, in examples wherein the first indication may be, for example, pre-configured, or receiving from e.g., the first node 111 or the another node 112, 114, in which case the obtaining may be performed, e.g., via the first link 161, the second link 162 or the third link 163.

Action 402

In some embodiments, the third node 113 may send, in this Action 402, based on the obtained first indication, the third message to the first node 111. The third message may indicate whether or not the third node 113 supports the indicated custody service.

The sending in this Action 402 may be performed, e.g., via the first link 161 and the second link 162.

The third node 113 may also use the LwM2M protocol to configure the first node 111 so that it may rely on the second node 112 and/or the fourth node 114 to provide reliability, that is, an assurance that the messages are always delivered to the third node 113, instead of using application layer reliability methods. For this purpose, a new management resource may be defined for one of the device management objects, e.g., LwM2M device management objects.

Action 403

The third node 113, in this Action 403, may receive the fourth message from the first node 111.

The receiving in this Action 403 may be performed over e.g., the first link 161 and the second link 162.

In some embodiments, the receiving in this Action 403 of the fourth message may further comprise receiving the plurality of fourth messages.

Action 404

In this Action 404, the third node 113 refrains, based on the obtained first indication, from sending the fifth message to the first node 111. The fifth message is one of an acknowledgement of receipt of the fourth message from the first node 111 and a request for retransmission of the fourth message. Instead, the third node 113 may perform Action 407.

Action 405

In this Action 405, the third node 113 receives the third indication from the another node 112, 114 operating in the communications network 10. The third indication indicates the electronic fingerprint of the fourth message received or to be received from the first node 111 operating in the communications network 10.

The receiving, e.g., a pull, or an observe action, in this Action 405 may be performed over e.g., the second link 162 or the third link 163.

In some embodiments wherein the receiving in Action 403 of the fourth message may further comprise receiving the plurality of fourth messages, the receiving in this Action 403 of the third indication may further comprise receiving the plurality of electronic fingerprints. Each of the electronic fingerprints in the plurality may uniquely identify the respective fourth message in the plurality of received fourth messages. In such embodiments, the third indication may indicate the plurality of respective electronic fingerprints.

In some embodiments, the third indication may comprise the respective third indication for each of the respective electronic fingerprints.

Action 406

In this Action 406, the third node 113 determines, based on the received third indication, whether or not the fourth message has been received.

Determining may be understood as e.g., calculating, deriving or similar.

The third node 113 may perform this Action 406 by comparing the indicated electronic fingerprint, or electronic fingerprints, with the received fourth message or the plurality of fourth messages. The third node 113 may calculate the electronic fingerprints over the encrypted fourth messages. The third node 113 may be understood to know the hash function used and perform the determination in this Action 406 based on the hash function.

Action 407

In this Action 407, the third node 113 sends the fifth message to the another node 112, 114, based on a result of the determination performed in Action 406. The fifth message is one of an acknowledgement of receipt of the fourth message and a request for retransmission of the fourth message.

The sending, e.g., providing, in this Action 407 may be performed over e.g., the second link 162 or the third link 163.

In some embodiments the result of the determination in Action 406 may have been that the fourth message has not been received, and the fifth message may be a request for retransmission of the fourth message.

If the third node 113 notices a missing fourth message as a result of Action 406, the third node 113 may send the fifth message to request the missing fourth message from the cache of the second node 112, or to the first node 111, if the packet may be really needed and was not stored by the second node 112. There may be two alternatives to implement this functionality: either the third node 113 may be aware of the middle storage, that is, the another node 112, 114, for the messages, in which case it may directly contact the storage, or it may not be aware of such storage and may send the retransmission request towards the first node 111. In the former case, the storage point may have been communicated to the third node 113 in Action 401, e.g., in the early phase of the communication e.g. as a parameter added to the connection initialization. In the latter case, the third node 113 may send the request towards the first node 111, and the fourth message may travel through the second node 112, that may intercept it in case the second node 112 may be responsible for handling the requests for this particular first node 111. The second node 112 or other assigned storage point, e.g., the fourth node 114, may respond to the request message sent from the third node 113, and the request message may then be not delivered to the first node 111.

The fifth message may uniquely identify the received or missing fourth message by using the indicated electronic fingerprint. As an additional optimization, the third node 113 may calculate the electronic fingerprints of the received messages and use Bloom filters to compress a set of electronic fingerprints into a single Bloom filter and deliver this, comprised in the fifth message, to the another node 112, 114. From this Bloom filter, the another node 112, 114 may be enabled to detect which messages have not been received by the third node 113.

In embodiments wherein the third node 113 may have received the fourth message in Action 403, the fifth message may be an acknowledgement of receipt to the another node 112, 114.

Security considerations for the second node 112 making the re-transmissions may be understood to need to be taken. The usual precautions of Datagram Transport Layer Security/Object Security for Constrained RESTful Environments (DTLS)/OSCORE attacks may need to be taken by the application server by the third node 113. When the third node 113 may request re-transmission from the second node 112, usual DTLS/OSCORE processing may be followed, since from the point of view of the third node 113, the retransmission may be a MAC layer retransmission. As long as the retransmissions happen during the same DTLS epoch, no further actions, e.g., a new DTLS handshake, or discarding of the messages, may be understood to be needed.

Embodiments herein may also allow the third node 113 to send the fifth message requesting resending of the fourth message to the first node 111 instead, that is to the original client, if the second node 112 has not stored the data. One such example is illustrated later, in FIG. 6. In such examples, a regular protocol, e.g., CoAP, retransmission protocol may be followed.

Action 408

In some embodiments wherein the result of the determination in Action 406 may have been that the fourth message has not been received, and the fifth message may be a request for retransmission of the fourth message to the another node 112, 114, the third node 113 may, in this Action 408, receive the fourth message from the another node 112, 114, based on the sent fifth message.

The receiving in this Action 408 may be performed over e.g., the second link 162 or the third link 163.

Figure 5:
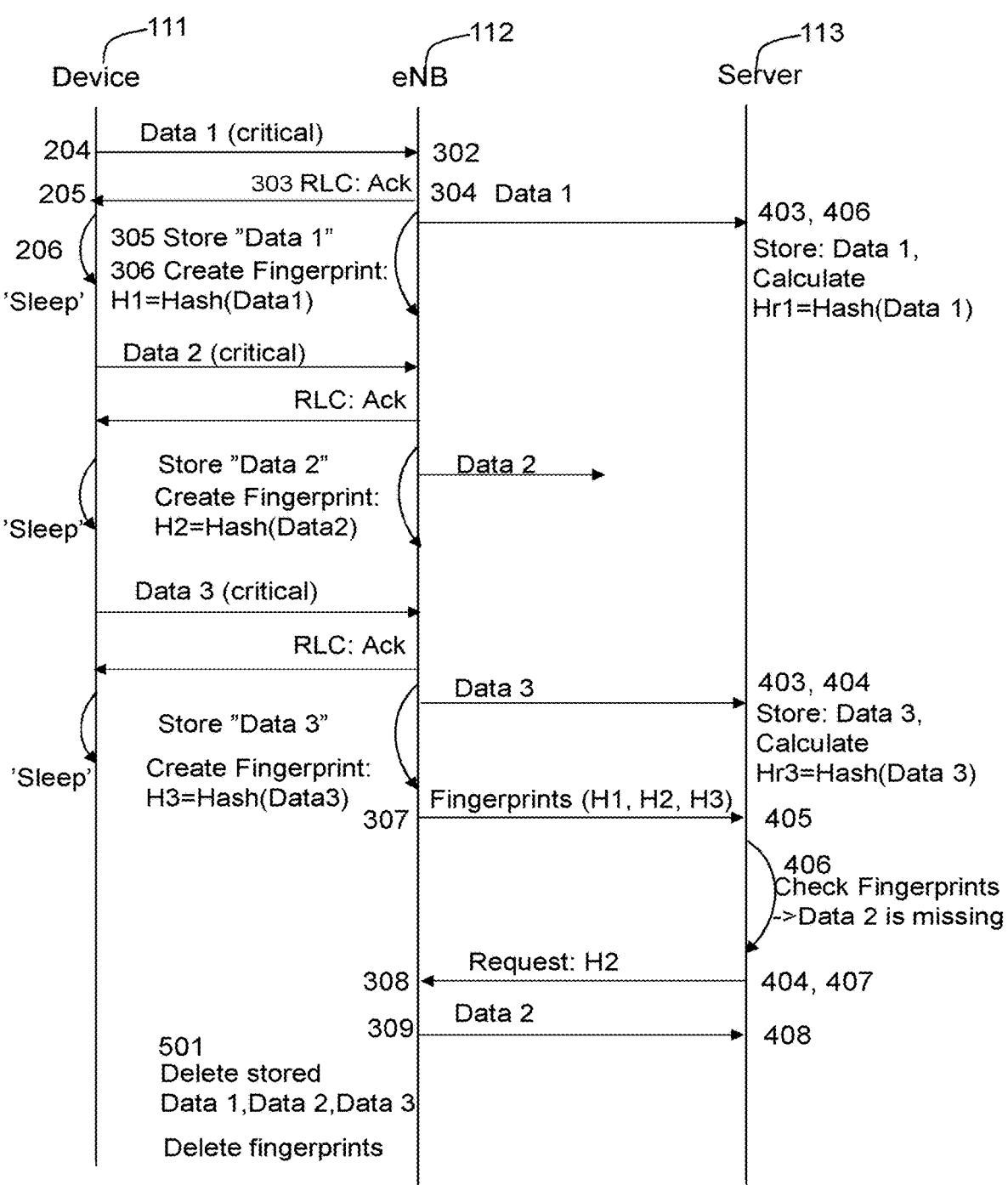
FIG. 5 is a flowchart depicting an example of a method in a communications network according to embodiments herein.

FIG. 5 is a schematic diagram illustrating a non-limiting example of the methods that may be performed by the first node 111, which in the non-limiting example of FIG. 5 is an IoT Device, the second node 112, which is an eNB, and the third node 113, which is a Server. In agreement with Action 204, the first node 111 sends the fourth message comprising "data 1" and the second indication indicating the high priority of the data, represented by "(critical)", to the third node 113, via the second node 112. The second node 112 receives the fourth message and the second indication according to Action 302. In this case, the second node 112 sends, according to Action 303, the indication to the first node 111 as an ACK on RLC, to indicate that it has received the fourth message. The first node 111 receives the ACK in accordance with Action 205 and does not have to wait for the ACK from the third node 113, in accordance with Action 206, but it goes into to sleep mode. The second node 112 stores the fourth message in accordance with Action 305, and creates, in accordance with Action 306, an electronic fingerprint "H1" of the fourth message as a Hash function of the fourth message (Hash(Data1)). In agreement with Action 304, the second node 112 also forwards the fourth message to the third node 113. The third node 113 receives the fourth message in agreement with Action 403, and calculates the hash function based on the received fourth message, in as part of Action 406. The same actions may be repeated for the plurality of fourth messages sent by the first node 111, here Data 2, and Data 3 in addition to Data 1. The second node 112, in accordance with Action 307, sends periodically electronic fingerprints to the third node 113, which after receiving them in accordance with Action 405 may, in accordance with Action 406, verify if it has received all fourth messages. H2 uniquely identifies Data 2 and H3 uniquely identifies Data 3. If this is not the case, as depicted in the example of FIG. 5, where Data 2 has not been received by the third node 113, the third node 113 may, in accordance with Action 404, refrain from sending the fifth message to the first node 111. In accordance with Action 407, the third node 113 may then request retransmission of Data 2 using the respective electronic fingerprint uniquely identifying this fourth message to the second node 112, and the second node 112, after receiving it in agreement with Action 308 may, in accordance with Action 309, resend the data, which may then be received by the third node 113 in accordance with Action 408. After a specified time, the second node 112 may, at 501, delete both the stored data and the electronic fingerprints.

Figure 6:
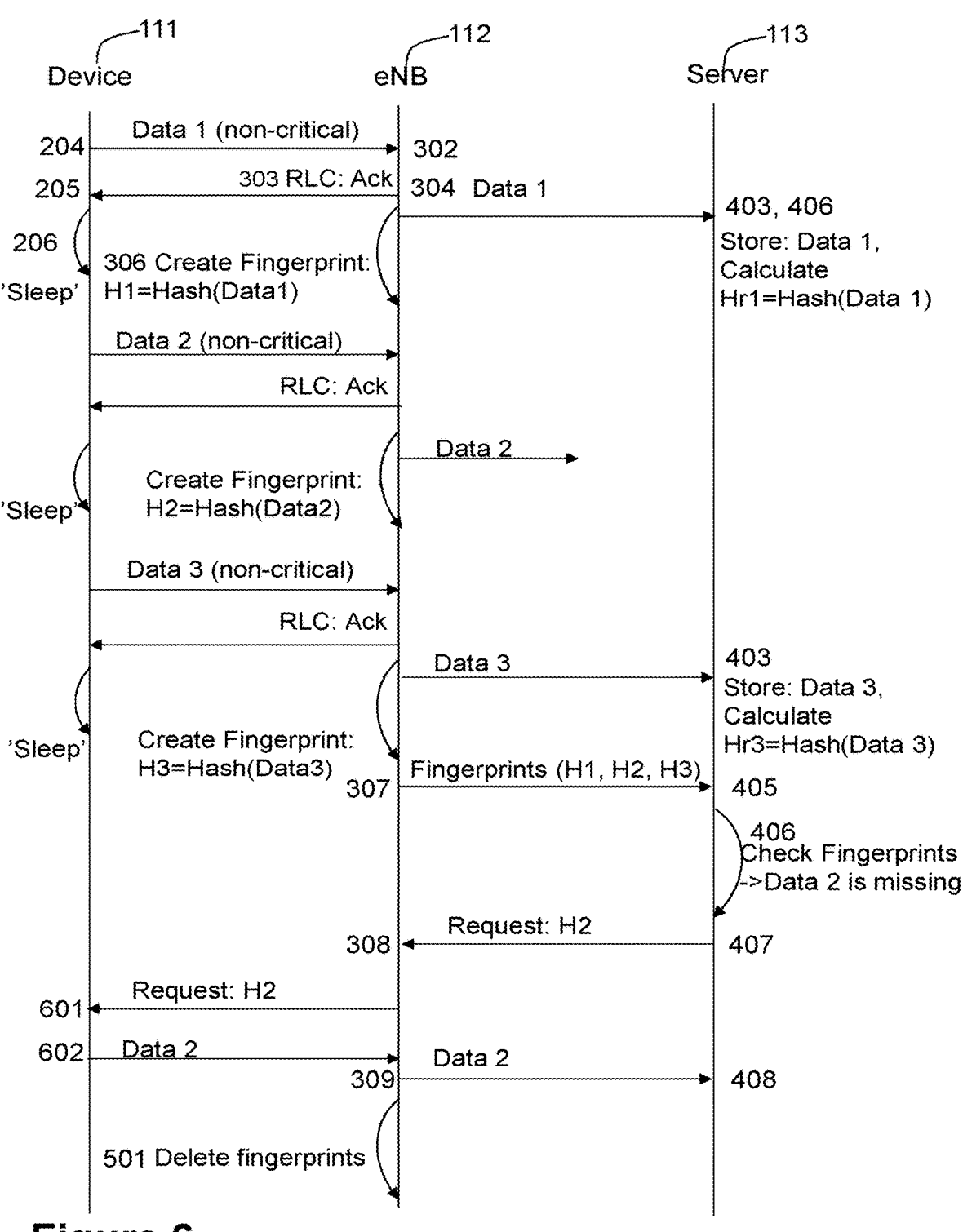
FIG. 6 is a flowchart depicting another example of a method in a communications network according to embodiments herein.

FIG. 6 is a schematic diagram illustrating another non-limiting example of the methods that may be performed by the first node 111, which in the non-limiting example of FIG. 6 is an IoT Device, the second node 112, which is an eNB, and the third node 113, which is a Server. The actions depicted are equivalent to those described for FIG. 5, with the difference that the data comprised in the fourth messages sent by the first node 111 is indicated to have a low priority, represented by "(non-critical)". In this example, the third node 113, instead of sending the fifth message to the second node 112 in Action 407, sends it addressed to the first node 111. In this example, also Data 2 has not reached the third node 113, which means that the fifth message is a request for re-transmission of Data 2. At 601, upon receipt of the fifth message forwarded by the second node 112, the first node 111 wakes up and re-sends the Data 2 to the third node 113 via the second node 112. Upon re-sending the fourth message to the third node 113 in agreement with Action 309, the second node 112 deletes the electronic fingerprints it has created for the plurality of fourth messages received from the first node 111 over this period, here H1, H2, and H3, as it assumes the respective fourth messages have been successfully received by the third node 113.

As explained earlier, one advantage of embodiments herein is that they enable devices to go to sleep right after receiving the first message, e.g., an RLC level ACK, from the radio access point, and this enables further power savings. Alternatively, other protocol layers in the 3GPP system may also be used when configured appropriately. For example, with HARQ, delivery may not be guaranteed, but it may be possible to configure a reliability lower than 100%, and this may be indicated to the higher layer requesting the service. For example, the probability of delivery may be set to, e.g., 99%.

Another advantage of embodiments herein is that the system is enabled to get end-to-end reliability with a lighter solution, that is with less complexity, for the device, which means less code and lower memory consumption, and a stateless implementation. Because the first node 111 may be understood to not need to keep state, e.g., copy of a message and a timer to detect if ACK is received, embodiments herein make the first node 111 stateless. A stateless protocol may be understood to be more lightweight than a protocol that may need to keep state.

Figure 7:
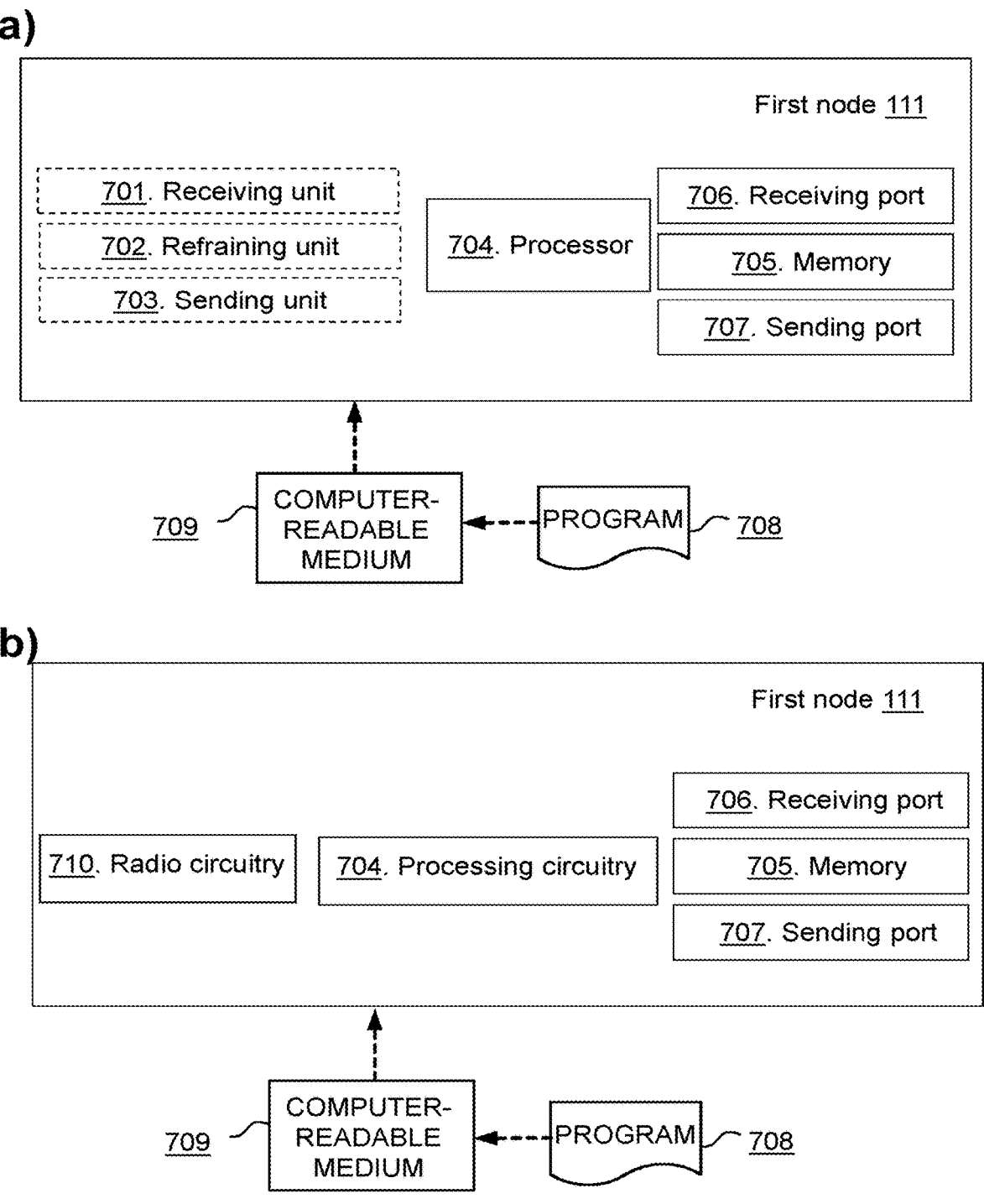
FIG. 7 is a schematic block diagram illustrating two non-limiting examples, a) and b), of a first node, according to embodiments herein.

FIG. 7 depicts two different examples in panels a) and b), respectively, of the arrangement that the first node 111 may comprise to perform the method actions described above in relation to FIG. 2. The first node 111 is configured to operate in the communications network 10.

The detailed description of some of the following corresponds to the same references provided above, in relation to the actions described for the first node 111, and will thus not be repeated here. For example, the wireless communications network 10 may be configured to operate on a LwM2M technology.

The first node 111 is configured to, e.g. by means of a receiving unit 701 within the first node 111 configured to, receive, from the second node 112 configured to operate in the communications network 10, the indication configured to acknowledge receipt, by the second node 112 or the fourth node 114 configured to operate in the communications network 10, of the message configured to be sent by the first node 111 to the third node 113 configured to operate in the communications network 10.

The first node 111 is also configured to, e.g. by means of a refraining unit 702 within the first node 111 configured to, refrain, before going into sleep mode, from waiting to receive from the third node 113 one of: a) the acknowledgement of receipt of the message configured to be sent, and b) the request for retransmission of the message configured to be sent. To refrain is configured to be based on the indication configured to be received.

In some embodiments, the first node 111 may be further configured to, e.g. by means of the receiving unit 701 within the first node 111 configured to, receive the first message from the second node 112. The first message may be configured to indicate the capability of the second node 112 or the fourth node 114 to keep custody of the fourth messages to be sent from the first node 111 to the third node 113.

In some embodiments, the first node 111 may be further configured to, e.g. by means of the receiving unit 701 within the first node 111 configured to, receive, in response to the second message configured to be sent, the third message from the third node 113. The third message may be configured to indicate whether or not the third node 113 may be configured to support the custody service configured to be indicated.

The first node 111 may be also configured to, e.g. by means of a sending unit 703 within the first node 111 configured to, send, based on the first message configured to be received, the second message to the third node 113. The second message may be configured to comprise the first indication configured to indicate the capability of the second node 112 or the fourth node 114 to have custody of fourth messages to be sent from the first node 111 to the third node 113.

In some embodiments, the first indication may be configured to be a LwM2M Object.

The first node 111 may be also configured to, e.g. by means of the sending unit 703 within the first node 111 configured to, send, after receipt of the third message configured to indicate that the third node 113 supports the custody service configured to be indicated, the message to the third node 113 via the second node 112 or the fourth node 114. The message may be configured to be the fourth message.

In some embodiments, the first node 111 may be further configured to send, to the second node 112, the second indication of the priority of the fourth message configured to be sent.

In some embodiments, the first node 111 may be configured to be the device 120, the second node 112 may be configured to be the radio network node 150 configured to serve the device 120, the third node 113 may be configured to be the network node 130 in the cloud 140, and the fourth node 114 may be configured to be another network node in the communications network 10.

The embodiments herein may be implemented through one or more processors, such as a processor 704 in the first node 111 depicted in FIG. 7, together with computer program code for performing the functions and actions of the embodiments herein. The processor 704 may be understood herein to be a hardware component. The program code mentioned above may also be provided as a computer program product, for instance in the form of a data carrier carrying computer program code for performing the embodiments herein when being loaded into the in the first node 111. One such carrier may be the cloud 140. It is however feasible with other data carriers such as a memory stick. The computer program code may furthermore be provided as pure program code on a server and downloaded to the first node 111.

The first node 111 may further comprise a memory 705 comprising one or more memory units. The memory 705 is arranged to be used to store obtained information, store data, configurations, schedulings, and applications etc. to perform the methods herein when being executed in the first node 111.

In some embodiments, the first node 111 may receive information from, e.g., the second node 112, the third node 113 and/or the fourth node 114, through a receiving port 706. In some examples, the receiving port 706 may be, for example, connected to one or more antennas in the first node 111. In other embodiments, the first node 111 may receive information from another structure in the communications network 10 through the receiving port 706. Since the receiving port 706 may be in communication with the processor 704, the receiving port 706 may then send the received information to the processor 704. The receiving port 706 may also be configured to receive other information.

The processor 704 in the first node 111 may be further configured to transmit or send information to e.g., the second node 112, the third node 113, the fourth node 114, and/or another structure in the communications network 10, through a sending port 707, which may be in communication with the processor 704, and the memory 705.

Any of the units 701-703 may be the processor 704 of the first node 111, or an application running on such processor.

Those skilled in the art will also appreciate that the units 701-703 described above may refer to a combination of analog and digital circuits, and/or one or more processors configured with software and/or firmware, e.g., stored in memory, that, when executed by the one or more processors such as the processor 704, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first node 111 may be respectively implemented by means of a computer program 708 product, comprising instructions, i.e., software code portions, which, when executed on at least one processor 704, cause the at least one processor 704 to carry out the actions described herein, as performed by the first node 111. The computer program 708 product may be stored on a computer-readable storage medium 709. The computer-readable storage medium 709, having stored thereon the computer program 708, may comprise instructions which, when executed on at least one processor 704, cause the, at least, one processor 704 to carry out the actions described herein, as performed by the first node 111. In some embodiments, the computer-readable storage medium 709 may be a non-transitory computer-readable storage medium, such as a memory stick, or stored in the cloud space. In other embodiments, the computer program 708 product may be stored on a carrier containing the computer program, wherein the carrier is one of an electronic signal, optical signal, radio signal, or the computer-readable storage medium 709, as described above.

The first node 111 may comprise an interface unit to facilitate communications between the first node 111 and other nodes or devices, e.g., the second node 112, the third node 113, the fourth node 114, and/or another structure in the communications network 10. In some particular examples, the interface may, for example, include a transceiver configured to transmit and receive radio signals over an air interface in accordance with a suitable standard.

In other embodiments, the first node 111 may comprise the following arrangement depicted in FIG. 7b. The first node 111 may comprise a processing circuitry 704, e.g., one or more processors such as the processor 704, in the first node 111 and the memory 705. The first node 111 may also comprise a radio circuitry 710, which may comprise e.g., the receiving port 706 and the sending port 707. The processing circuitry 704 may be configured to, or operable to, perform the method actions according to FIG. 2 and/or FIGS. 5-6, in a similar manner as that described in relation to FIG. 7a. The radio circuitry 710 may be configured to set up and maintain at least a wireless connection with the second node 112, the third node 113, the fourth node 114, and/or another structure in the communications network 10. Circuitry may be understood herein as a hardware component.

Hence, embodiments herein also relate to the first node 111 operative to operate in the communications network 10. The first node 111 may comprise the processing circuitry 704 and the memory 705, said memory 705 containing instructions executable by said processing circuitry 704, whereby the first node 111 is further operative to perform the actions described herein in relation to the first node 111, e.g., FIG. 2 and/or FIGS. 5-6.

Figure 8:
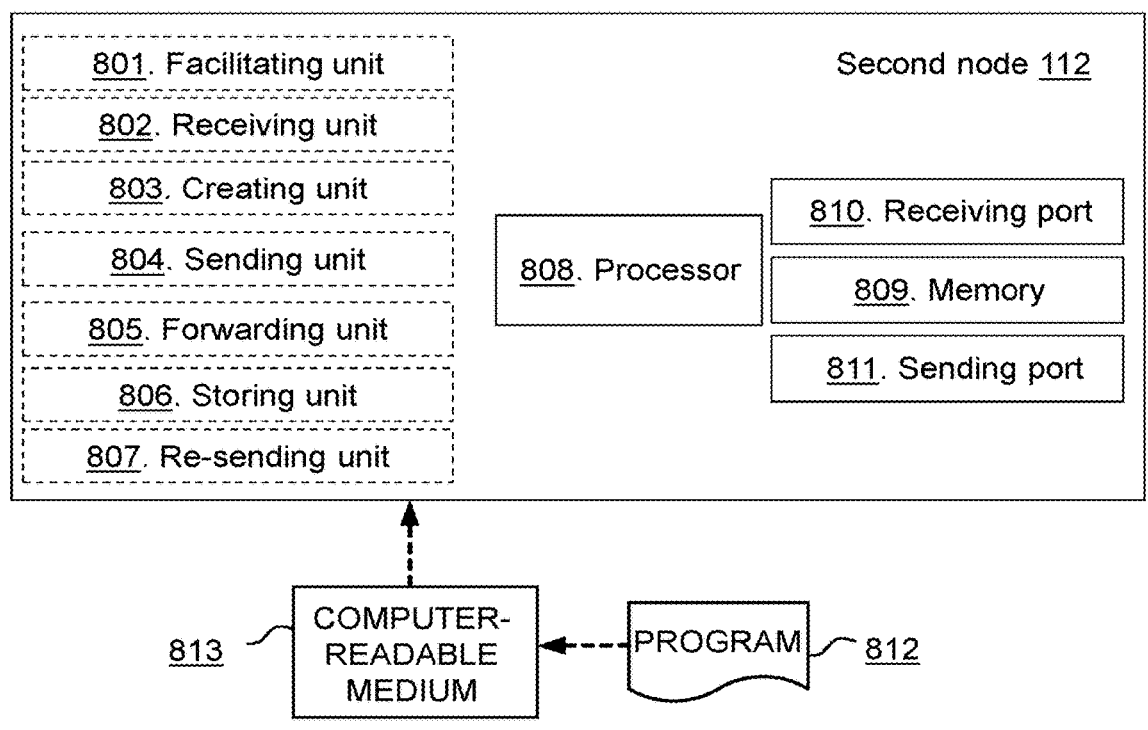
FIG. 8 is a schematic block diagram illustrating two non-limiting examples, a) and b), of a second node, according to embodiments herein.
Figure 8:
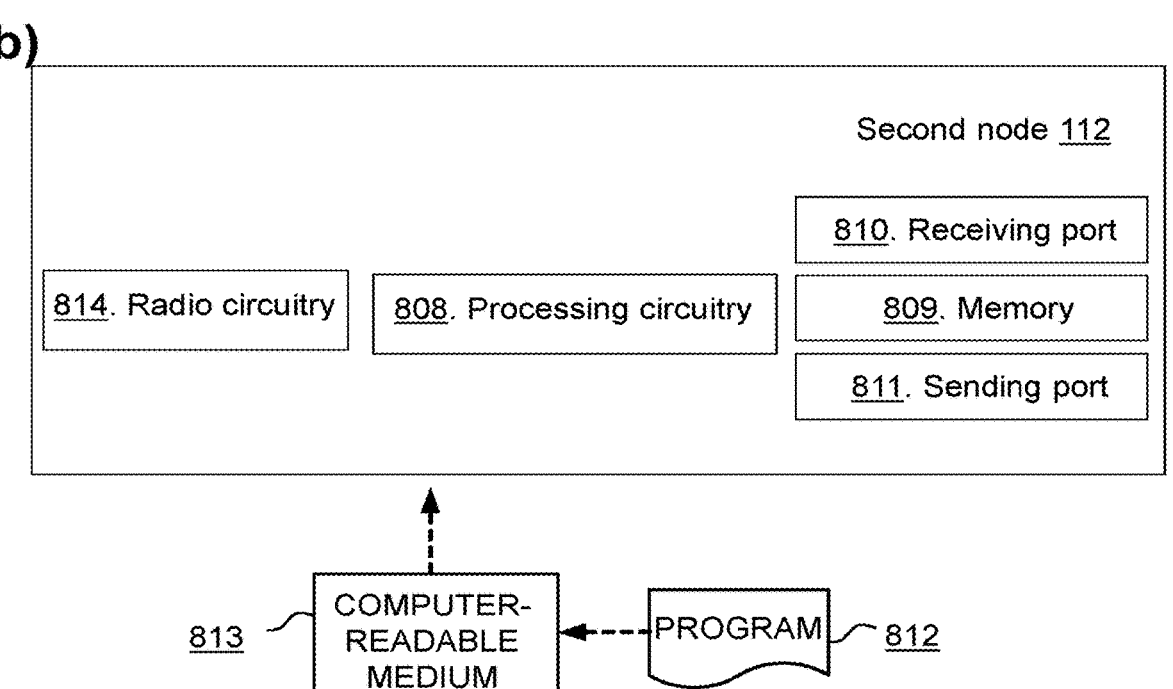

FIG. 8 depicts two different examples in panels a) and b), respectively, of the arrangement that the second node 112 may comprise to perform the method actions described above in relation to FIG. 3. The second node 112 is configured to operate in the communications network 10.

The detailed description of some of the following corresponds to the same references provided above, in relation to the actions described for the second node 112, and will thus not be repeated here. For example, the wireless communications network 10 may be configured to operate on the LwM2M technology.

In some embodiments, the second node 112 may comprise the following arrangement depicted in FIG. 8a.

The second node 112 is configured to, e.g. by means of a facilitating unit 801 within the second node 112 configured to, facilitate sending the first message to the first node 111 configured to operate in the communications network 10. The first message is configured to indicate the capability of the second node 112 or the fourth node 114 configured to operate in the communications network 10 to keep custody of fourth messages configured to be to be sent from the first node 111 to the third node 113 configured to operate in the communications network 10.

In some embodiments, the fourth node 114 may be configured to have the capability to keep custody of the fourth messages. In some of such embodiments, the second node 112 may be further configured to, e.g. by means of a receiving unit 802 within the second node 112 configured to, receive, after having facilitated the sending of the first message, the fourth message from the first node 111. The fourth message may be configured to be addressed to the third node 113.

The second node 112 is further configured to handle the fourth message based on the capability configured to be indicated, wherein, according to a first option a), with the proviso that the second node 112 is configured to have the capability to keep custody of the fourth messages, the second node 112 is further configured to, e.g. by means of a creating unit 803 within the second node 112 configured to, create the electronic fingerprint uniquely identifying the received fourth message.

Also with the proviso that the second node 112 is configured to have the capability to keep custody of the fourth messages, the second node 112 is further configured to, e.g. by means of a sending unit 804 within the second node 112 configured to, send the third indication of the electronic fingerprint configured to be created to the third node 113.

According to a second option b), with the proviso that the fourth node 114 is configured to have the capability to keep custody of the fourth messages, the second node 112 is further configured to, e.g., by means of a forwarding unit 805 within the second node 112 configured to, forward the fourth message configured to be received to the fourth node 114.

In some embodiments wherein the second node 112 may be configured to have the capability to keep custody of the fourth messages, the second node 112 may be further configured to, e.g. by means of the forwarding unit 805 within the second node 112 configured to, forward the fourth message configured to be received to the third node 113.

In some embodiments, e.g., some of the embodiments described in the previous paragraph, the second node 112 may be further configured to, e.g. by means of the receiving unit 802 within the second node 112 configured to, receive the fifth message from the third node 113. The fifth message may be configured to be the request for retransmission of the fourth message from the first node 111. The request may be configured to identify the message configured to be forwarded based on the third indication configured to be sent.

In some embodiments wherein the second node 112 may be configured to have the capability to keep custody of the fourth messages, the second node 112 may be further configured to, e.g. by means of a storing unit 806 within the second node 112 configured to, store the fourth message configured to be received.

In some embodiments, e.g., some of the embodiments described in the previous paragraph, the second node 112 may be further configured to, e.g. by means of a re-sending unit 807 within the second node 112 configured to, re-send the fourth message to the third node 113, based on the fifth message configured to be received.

In some embodiments, the second node 112 may be configured to, e.g. by means of the sending unit 801 within the second node 112 configured to, send the indication to the first node 111 acknowledging receipt of the fourth message by the second node 112.

In some embodiments, the second node 112 may be further configured to receive, from the first node 111, the second indication of the priority of the fourth message configured to be received. To create the electronic fingerprint in such embodiments may be configured to be further based on the priority configured to be indicated.

In some embodiments, to receive may be further configured to comprise receiving the a plurality of fourth messages, wherein to create may be further configured to comprise creating the plurality of electronic fingerprints, each of the electronic fingerprints in the plurality being configured to uniquely identify the respective message in the plurality of fourth messages configured to be received. The third indication may be configured to indicate the plurality of respective electronic fingerprints configured to be created.

In some embodiments, the third indication may be configured to comprise the respective third indication for each of the respective electronic fingerprints configured to be created.

The second node 112 may be configured to be one of: the radio network node 150 serving the device 120, and the fourth node 114 in the communications network 10. The third node 113 may be configured to be the network node 120 in the cloud 140. The first node 111 may be configured to be the device 120.

The embodiments herein may be implemented through one or more processors, such as a processor 808 in the second node 112 depicted in FIG. 8a, together with computer program code for performing the functions and actions of the embodiments herein. The processor 808 may be understood herein to be a hardware component. The program code mentioned above may also be provided as a computer program product, for instance in the form of a data carrier carrying computer program code for performing the embodiments herein when being loaded into the in the second node 112. It is however feasible with other data carriers such as a memory stick. The computer program code may furthermore be provided as pure program code on a server and downloaded to the second node 112.

The second node 112 may further comprise a memory 809 comprising one or more memory units. The memory 809 is arranged to be used to store obtained information, store data, configurations, schedulings, and applications etc. to perform the methods herein when being executed in the second node 112.

In some embodiments, the second node 112 may receive information from, e.g., the first node 111, the third node 113, and/or the fourth node 114, through a receiving port 810. In some examples, the receiving port 810 may be, for example, connected to one or more antennas in second node 112. In other embodiments, the second node 112 may receive information from another structure in the communications network 10 through the receiving port 810. Since the receiving port 810 may be in communication with the processor 808, the receiving port 810 may then send the received information to the processor 808. The receiving port 810 may also be configured to receive other information.

The processor 808 in the second node 112 may be further configured to transmit or send information to e.g., the first node 111, the third node 113, the fourth node 114, and/or another structure in the communications network 10, through a sending port 811, which may be in communication with the processor 808, and the memory 809.

Any of the units 801-807 may be the processor 808 of the second node 112, or an application running on such processor.

Those skilled in the art will also appreciate that the units 801-807, the sending unit 802 and the determining unit 803 described above may refer to a combination of analog and digital circuits, and/or one or more processors configured with software and/or firmware, e.g., stored in memory, that, when executed by the one or more processors such as the processor 808, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the second node 112 may be respectively implemented by means of a computer program 812 product, comprising instructions, i.e., software code portions, which, when executed on at least one processor 808, cause the at least one processor 808 to carry out the actions described herein, as performed by the second node 112. The computer program 812 product may be stored on a computer-readable storage medium 813. The computer-readable storage medium 813, having stored thereon the computer program 812, may comprise instructions which, when executed on at least one processor 808, cause the at least one processor 808 to carry out the actions described herein, as performed by the second node 112. In some embodiments, the computer-readable storage medium 813 may be a non-transitory computer-readable storage medium, such as memory stick, or stored in the cloud space. In other embodiments, the computer program 812 product may be stored on a carrier containing the computer program, wherein the carrier is one of an electronic signal, optical signal, radio signal, or the computer-readable storage medium 813, as described above.

The second node 112 may comprise an interface unit to facilitate communications between the second node 112 and other nodes or devices, e.g., the first node 111, the third node 113, the fourth node 114, and/or another structure in the communications network 10. In some particular examples, the interface may, for example, include a transceiver configured to transmit and receive radio signals over an air interface in accordance with a suitable standard.

In other embodiments, the second node 112 may comprise the following arrangement depicted in FIG. 8*b*. The second node 112 may comprise a processing circuitry 808, e.g., one or more processors such as the processor 808, in the second node 112 and the memory 809. The second node 112 may also comprise a radio circuitry 814, which may comprise e.g., the receiving port 810 and the sending port 811. The processing circuitry 808 may be configured to, or operable to, perform the method actions according to FIG. 3 and/or FIGS. 5-6 in a similar manner as that described in relation to FIG. 8*a*. The radio circuitry 814 may be configured to set up and maintain at least a wireless connection with the first node 111, the third node 113, the fourth node 114, and/or another structure in the communications network 10. Circuitry may be understood herein as a hardware component.

Hence, embodiments herein also relate to the second node 112 operative to operate in the communications network 10. The second node 112 may comprise the processing circuitry 808 and the memory 809, said memory 809 containing instructions executable by said processing circuitry 808, whereby the second node 112 is further operative to perform the actions described herein in relation to the second node 112, e.g., in FIG. 3 and/or FIGS. 5-6.

Figure 9:
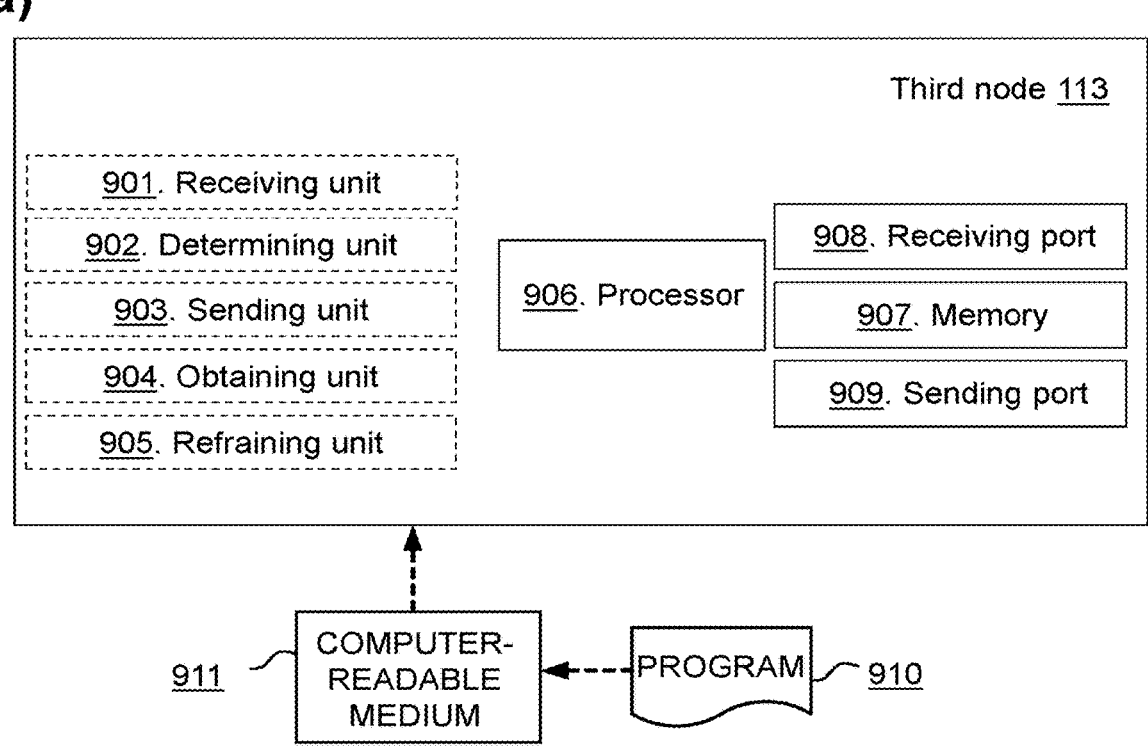
FIG. 9 is a schematic block diagram illustrating a non-limiting example of a third node, according to embodiments herein.
Figure 9:
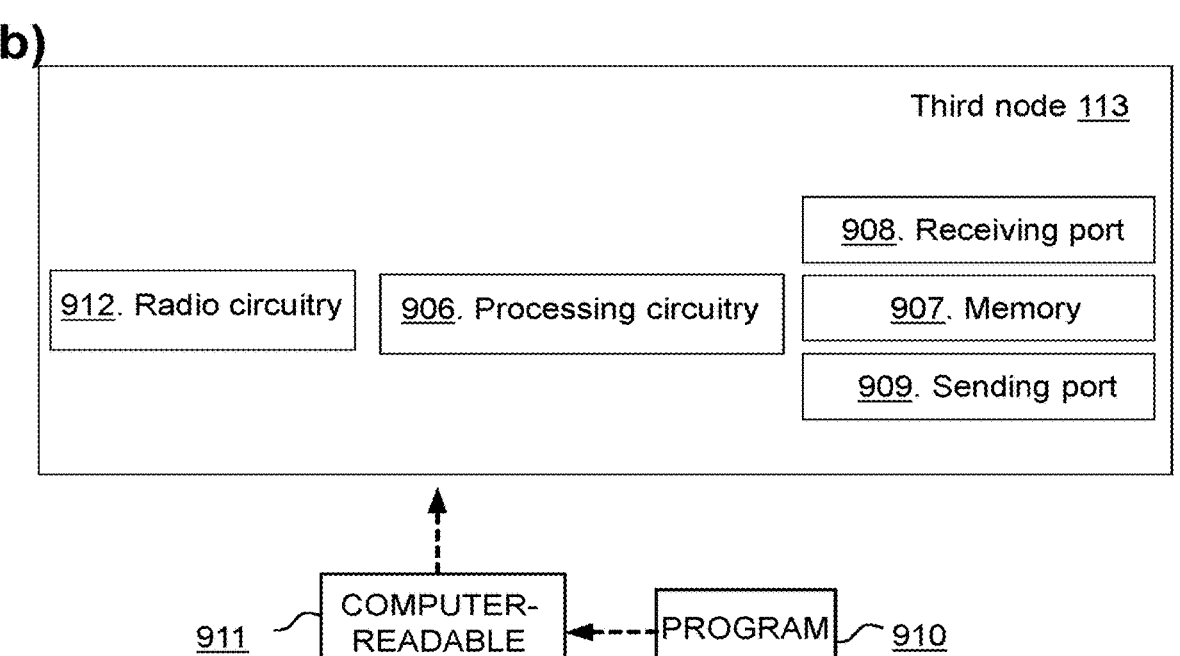

FIG. 9 depicts two different examples in panels a) and b), respectively, of the arrangement that the third node 113 may comprise to perform the method actions described above in relation to FIG. 4. The third node 113 is configured to operate in the communications network 10.

The detailed description of some of the following corresponds to the same references provided above, in relation to the actions described for the third node 113, and will thus not be repeated here. For example, the wireless communications network 10 may be configured to operate on the LwM2M technology.

In some embodiments, the third node 113 may comprise the following arrangement depicted in FIG. 9*a*.

The third node 113 is configured to, e.g. by means of a receiving unit 901 within the third node 113 configured to, receive the third indication from the another node 112, 114 configured to operate in the communications network 10. The third indication is configured to indicate the electronic fingerprint of the fourth message configured to be received from the first node 111 configured to operate in the communications network 10.

The third node 113 is also configured to, e.g. by means of a determining unit 902 within the third node 113 configured to, determine, based on the third indication configured to be received, whether or not the fourth message has been received.

The third node 113 is further configured to, e.g. by means of a sending unit 903 within the third node 113 configured to, send the fifth message to the another node 112, 114, based on the result of the determination. The fifth message may be configured to be one of the acknowledgement of receipt of the fourth message and the request for retransmission of the fourth message.

The third node 113 may be configured to, e.g. by means of an obtaining unit 904 within the third node 113 configured to, obtain the first indication. The first indication may be configured to indicate the capability of the another node 112, 114 to have custody of the fourth messages configured to be to be sent from the first node 111 to the third node 113.

In some examples, the first indication may be configured to be a LwM2M Object.

In some embodiments, the third node 113 may be further configured to, e.g. by means of the sending unit 903 within the third node 113 configured to, send, based on the first indication configured to be obtained, the third message to the first node 111. The third message may be configured to indicate whether or not the third node 113 supports the custody service configured to be indicated.

The third node 113 may be configured to, e.g. by means of a refraining unit 905 within the third node 113 configured to, refrain, based on the first indication configured to be obtained, from sending the fifth message to the first node 111.

In some embodiments wherein the result of the determination may be configured to be that the fourth message has not been received, and wherein the fifth message may be configured to be the request for retransmission of the fourth message to the another node 112, 114, the third node 113 may be further configured to, e.g. by means of the receiving unit 901 within the third node 113 configured to, receive the fourth message from the another node 112, 114, based on the fifth message configured to be sent.

In some embodiments, the third node 113 may be further configured to, e.g. by means of the receiving unit 901 within the third node 113 configured to receive the fourth message from the first node 111. In some of such embodiments, the fifth message may be configured to be an acknowledgement of receipt to the another node 112, 114.

In some embodiments, the receiving of the fourth message may be further configured to comprise receiving the plurality of fourth messages. In some of such embodiments, the receiving of the third indication may be further configured to comprise receiving the plurality of electronic fingerprints. Each of the electronic fingerprints in the plurality may be configured to uniquely identify a respective fourth message in the plurality of fourth messages configured to be received. The third indication may be configured to indicate the plurality of respective electronic fingerprints.

In some embodiments, the third indication may be further configured to comprise the respective third indication for each of the respective electronic fingerprints.

In some embodiments, the third node 113 may be configured to be the network node 130 in the cloud 140. The first node 111 may be configured to be the device 120. The another node 112, 114 may be configured to be one of: the radio network node 150 serving the device 120, and the fourth node 114 in the communications network 10.

The embodiments herein may be implemented through one or more processors, such as a processor 906 in the third node 113 depicted in FIG. 9*a*, together with computer program code for performing the functions and actions of the embodiments herein. The processor 906 may be understood herein to be a hardware component. The program code mentioned above may also be provided as a computer program product, for instance in the form of a data carrier carrying computer program code for performing the embodiments herein when being loaded into the in the third node 113. It is however feasible with other data carriers such as a memory stick. The computer program code may furthermore be provided as pure program code on a server and downloaded to the third node 113.

The third node 113 may further comprise a memory 907 comprising one or more memory units. The memory 907 is arranged to be used to store obtained information, store data, configurations, schedulings, and applications etc. to perform the methods herein when being executed in the third node 113.

In some embodiments, the third node 113 may receive information from, e.g., the first node 111, the second node 112, and/or the fourth node 114, through a receiving port 908. In some examples, the receiving port 908 may be, for example, connected to one or more antennas in third node 113. In other embodiments, the third node 113 may receive information from another structure in the communications network 10 through the receiving port 908. Since the receiving port 908 may be in communication with the processor 906, the receiving port 908 may then send the received information to the processor 906. The receiving port 908 may also be configured to receive other information.

The processor 906 in the third node 113 may be further configured to transmit or send information to e.g., the first node 111, the second node 112, the fourth node 114, and/or another structure in the communications network 10, through a sending port 909, which may be in communication with the processor 906, and the memory 907.

Any of the units 901-905 may be the processor 906 of the third node 113, or an application running on such processor.

Those skilled in the art will also appreciate that the units 901-905, the sending unit 902 and the determining unit 903 described above may refer to a combination of analog and digital circuits, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the third node 113 may be respectively implemented by means of a computer program 910 product, comprising instructions, i.e., software code portions, which, when executed on at least one processor 906, cause the at least one processor 906 to carry out the actions described herein, as performed by the third node 113. The computer program 910 product may be stored on a computer-readable storage medium 911. The computer-readable storage medium 911, having stored thereon the computer program 910, may comprise instructions which, when executed on at least one processor 906, cause the at least one processor 906 to carry out the actions described herein, as performed by the third node 113. In some embodiments, the computer-readable storage medium 911 may be a non-transitory computer-readable storage medium, such as memory stick, or stored in the cloud space. In other embodiments, the computer program 910 product may be stored on a carrier containing the computer program, wherein the carrier is one of an electronic signal, optical signal, radio signal, or the computer-readable storage medium 911, as described above.

The third node 113 may comprise an interface unit to facilitate communications between the third node 113 and other nodes or devices, e.g., the first node 111, the second node 112, the fourth node 114, and/or another structure in the communications network 10. In some particular examples, the interface may, for example, include a transceiver configured to transmit and receive radio signals over an air interface in accordance with a suitable standard.

In other embodiments, the third node 113 may comprise the following arrangement depicted in FIG. 9b. The third node 113 may comprise a processing circuitry 906, e.g., one or more processors such as the processor 906, in the third node 113 and the memory 907. The third node 113 may also comprise a radio circuitry 912, which may comprise e.g., the receiving port 908 and the sending port 909. The processing circuitry 906 may be configured to, or operable to, perform the method actions according to FIG. 4 and/or FIGS. 5-6 in a similar manner as that described in relation to FIG. 9a. The radio circuitry 912 may be configured to set up and maintain at least a wireless connection with the first node 111, the second node 112, the fourth node 114, and/or another structure in the communications network 10. Circuitry may be understood herein as a hardware component.

Hence, embodiments herein also relate to the third node 113 operative to operate in the communications network 10. The third node 113 may comprise the processing circuitry 906 and the memory 907, said memory 907 containing instructions executable by said processing circuitry 906, whereby the third node 113 is further operative to perform the actions described herein in relation to the third node 113, e.g., in FIG. 4 and/or FIGS. 5-6.

The following are particular examples of embodiments herein:

Example 1: A method performed by a first node (111), the first node (111) operating in a communications network (10), the method comprising:

receiving (205), from a second node (112) operating in the communications network (10), an indication acknowledging receipt, by the second node (112) or a fourth node (114) operating in the communications network (10), of a message sent by the first node (111) to a third node (113) operating in the communications network (10), and refraining (206), before going into sleep mode, from waiting to receive from the third node (113) one of: a) an acknowledgement of receipt of the sent message, and b) a request for retransmission of the sent message, wherein the refraining (206) is based on the received indication.

Example 2: The method according to example 1, the method further comprising:

receiving (201) a first message from the second node (112), the first message indicating a capability of the second node (112) or the fourth node (114) to keep custody of fourth messages to be sent from the first node (111) to the third node (113), and sending (202), based on the received first message, a second message to the third node (113), the second message comprising a first indication indicating the capability of the second node (112) or the fourth node (114) to have custody of fourth messages to be sent from the first node (111) to the third node (113), and receiving (203), in response to the sent second message, a third message from the third node (113), the third message indicating whether or not the third node (113) supports the indicated custody service.

Example 3: The method according to example 2, the method further comprising:

sending (204), after receipt of the third message indicating that the third node (113) supports the indicated custody service, the message to the third node (113) via the second node (112) or the fourth node (114), the message being a fourth message.

Example 4: The method according to according to example 3, wherein the first node (111) further sends, to the second node (112), a second indication of a priority of the sent fourth message.

Example 5: The method according to any of examples 1-4, wherein the first node (111) is a device (120), the second node (112) is a radio network node (150) serving the device (120), the third node (113) is a network node (130) in the cloud (140), and the fourth node (114) is another network node in the communications network (10).

Example 6: The method according to any of examples 1-5, wherein the communications network (10) operates on a Lightweight Machine to Machine, LwM2M, technology.

Example 7: A method performed by a third node (113), the third node (113) operating in a communications network (10), the method comprising:

receiving (405) a third indication from another node (112, 114) operating in the communications network (10), the third indication indicating an electronic fingerprint of a fourth message received or to be received from a first node (111) operating in the communications network (10), determining (406), based on the received third indication, whether or not the fourth message has been received, and sending (407) a fifth message to one of: the another node (112, 114) and the first node (111), based on a result of the determination, the fifth message being one of an acknowledgement of receipt of the fourth message and a request for retransmission of the fourth message.

Example 8: The method according to example 7, further comprising:

obtaining (401) a first indication indicating a capability of the another node (112, 114) to have custody of fourth messages to be sent from the first node (111) to the third node (113).

Example 9: The method according to example 8, further comprising:

sending (402), based on the obtained first indication, a third message to the first node (111), the third message indicating whether or not the third node (113) supports the indicated custody service.

Example 10: The method according to any of examples 8-9, further comprising:

refraining (404), based on the obtained first indication, from sending the fifth message to the first node (111).

Example 11: The method according to example 10, wherein the result of the determination is that the fourth message has not been received, and wherein the fifth message is a request for retransmission of the fourth message to the another node (112, 114), and wherein the method further comprises:

receiving (408) the fourth message from the another node (112, 114), based on the sent fifth message.

Example 12: The method according to any of examples 7-11, further comprising:

receiving (403) the fourth message from the first node (111), and wherein the fifth message is an acknowledgement of receipt to the another node (112, 114).

Example 13: The method according to example 12, wherein the receiving (403) of the fourth message further comprises receiving a plurality of fourth messages, and wherein the receiving (405) of the third indication further comprises receiving a plurality of electronic fingerprints, each of the electronic fingerprints in the plurality uniquely identifying a respective fourth message in the plurality of received fourth messages, and wherein the third indication indicates the plurality of respective electronic fingerprints.

Example 14: The method according to example 13, wherein the third indication comprises a respective third indication for each of the respective electronic fingerprints.

Example 15: The method according to according to any of examples 7-14, wherein the third node (113) is a network node (130) in the cloud (140), the first node (111) is a device (120), and the another node (112, 114) is one of: a radio network node (150) serving the device (120), and a fourth node (114) in the communications network (10).

Example 16: The method according to any of examples 7-15, wherein the communications network (10) operates on a Lightweight Machine to Machine, LwM2M, technology.

Example 17: A method performed by a second node (112), the second node (112) operating in a communications network (10), the method comprising:

facilitating (301) sending a first message to a first node (111) operating in the communications network (10), the first message indicating a capability of the second node (112) or a fourth node (114) operating in the communications network (10) to keep custody of fourth messages to be sent from the first node (111) to a third node (113) operating in the communications network (10), receiving (302), after having facilitated the sending of the first message, a fourth message from the first node (111), the fourth message being addressed to the third node (113), and handling the fourth message based on the indicated capability, wherein:

a) with the proviso that the second node (112) has the capability to keep custody of the fourth messages, the method further comprises:

i. creating (306) an electronic fingerprint uniquely identifying the received fourth message, and ii. sending (307) a third indication of the created electronic fingerprint to the third node (113).

b) with the proviso that the fourth node (114) has the capability to keep custody of the fourth messages, the method further comprises:

i. forwarding (304) the received fourth message to the fourth node (114).

Example 18: The method according to example 17, wherein the second node (112) has the capability to keep custody of the fourth messages, and wherein the method further comprises:

forwarding (304) the received fourth message to the third node (113), and receiving (308) a fifth message from the third node (113), the fifth message being a request for retransmission of the fourth message from the first node (111), the request identifying the forwarded message based on the sent third indication.

Example 19: The method according to example 18, further comprising:

storing (305) the received fourth message, and re-sending (309) the fourth message to the third node (113), based on the received fifth message.

Example 20: The method according to any of examples 17-19, further comprising:

sending (303) an indication to the first node (111) acknowledging receipt of the fourth message by the second node (112).

Example 21: The method according to any of examples 17-20, wherein the second node (112) further receives, from the first node (111), a second indication of a priority of the received fourth message, and wherein the creating (306) of the electronic fingerprint is further based on the indicated priority.

Example 22: The method according to any of examples 17-21, wherein the receiving (302) further comprises receiving a plurality of fourth messages, wherein the creating (306) further comprises creating a plurality of electronic fingerprints, each of the electronic fingerprints in the plurality uniquely identifying a respective message in the plurality of received fourth messages, and wherein the third indication indicates the plurality of created respective electronic fingerprints.

Example 23: The method according to example 22, wherein the third indication comprises a respective third indication for each of the created respective electronic fingerprints.

Example 24: The method according to according to any of examples 17-23 wherein the second node (112) is one of: a network node (130) radio network node (150) serving the device (120), and a fourth node (114) in the communications network (10), the third node (113) is a network node (120) in the cloud (140), and the first node (111) is a device (120).

Example 25: The method according to any of examples 17-24, wherein the communications network (10) operates on a Lightweight Machine to Machine, LwM2M, technology.

Example 26: A first node (111) configured to operate in a communications network (10), the first node (111) being further configured to:

receive, from a second node (112) configured to operate in the communications network (10), an indication configured to acknowledge receipt, by the second node (112) or a fourth node (114) configured to operate in the communications network (10), of a message configured to be sent by the first node (111) to a third node (113) configured to operate in the communications network (10), and refrain (206), before going into sleep mode, from waiting to receive from the third node (113) one of: a) an acknowledgement of receipt of the message configured to be sent, and b) a request for retransmission of the message configured to be sent, wherein to refrain is configured to be based on the indication configured to be received.

Example 27: The first node (111) according to example 26, the first node (111) being further configured to:

receive a first message from the second node (112), the first message being configured to indicate a capability of the second node (112) or the fourth node (114) to keep custody of fourth messages to be sent from the first node (111) to the third node (113), and send, based on the first message configured to be received, a second message to the third node (113), the second message being configured to comprise a first indication configured to indicate the capability of the second node (112) or the fourth node (114) to have custody of fourth messages to be sent from the first node (111) to the third node (113), and receive, in response to the second message configured to be sent, a third message from the third node (113), the third message being configured to indicate whether or not the third node (113) is configured to support the custody service configured to be indicated.

Example 28: The first node (111) according to example 27, the first node (111) being further configured to:

send, after receipt of the third message configured to indicate that the third node (113) supports the custody service configured to be indicated, the message to the third node (113) via the second node (112) or the fourth node (114), the message being configured to be a fourth message.

Example 29: The first node (111) according to according to example 28, wherein the first node (111) is further configured to send, to the second node (112), a second indication of a priority of the fourth message configured to be sent.

Example 30: The first node (111) according to any of examples 26-29, wherein the first node (111) is configured to be a device (120), the second node (112) is configured to be a radio network node (150) configured to serve the device (120), the third node (113) is configured to be a network node (130) in the cloud (140), and the fourth node (114) is configured to be another network node in the communications network (10).

Example 31: The first node (111) according to any of examples 26-30, wherein the communications network (10) is configured to operate on a Lightweight Machine to Machine, LwM2M, technology.

Example 32: A third node (113) configured to operate in a communications network (10), the third node (113) being further configured to:

receive a third indication from another node (112, 114) configured to operate in the communications network (10), the third indication being configured to indicate an electronic fingerprint of a fourth message configured to be received from a first node (111) configured to operate in the communications network (10), determine, based on the third indication configured to be received, whether or not the fourth message has been received, and send a fifth message to the another node (112, 114) based on a result of the determination, the fifth message being configured to be one of an acknowledgement of receipt of the fourth message and a request for retransmission of the fourth message.

Example 33: The third node (113) according to example 32, being further configured to:

obtain a first indication being configured to indicate a capability of the another node (112, 114) to have custody of fourth messages configured to be to be sent from the first node (111) to the third node (113).

Example 34: The third node (113) according to example 33, being further configured to:

send, based on the first indication configured to be obtained, a third message to the first node (111), the third message being configured to indicate whether or not the third node (113) supports the custody service configured to be indicated.

Example 35: The third node (113) according to any of examples 33-34, being further configured to:

refrain, based on the first indication configured to be obtained, from sending the fifth message to the first node (111).

Example 36: The third node (113) according to example 35, wherein the result of the determination is configured to be that the fourth message has not been received, and wherein the fifth message is configured to be a request for retransmission of the fourth message to the another node (112, 114), and wherein the third node (113) is further configured to:

receive the fourth message from the another node (112, 114), based on the fifth message configured to be sent.

Example 37: The third node (113) according to any of examples 32-36, being further configured to:

receive the fourth message from the first node (111), and wherein the fifth message is configured to be an acknowledgement of receipt to the another node (112, 114).

Example 38: The third node (113) according to example 37, wherein the receiving of the fourth message is further configured to comprise receiving a plurality of fourth messages, and wherein the receiving of the third indication is further configured to comprise receiving a plurality of electronic fingerprints, each of the electronic fingerprints in the plurality being configured to uniquely identify a respective fourth message in the plurality of fourth messages configured to be received, and wherein the third indication is configured to indicate the plurality of respective electronic fingerprints.

Example 39: The third node (113) according to example 38, wherein the third indication is further configured to comprise a respective third indication for each of the respective electronic fingerprints.

Example 40: The third node (113) according to according to any of examples 32-39, wherein the third node (113) is configured to be a network node (130) in the cloud (140), the first node (111) is configured to be a device (120), and the another node (112, 114) is configured to be one of: a radio network node (150) serving the device (120), and a fourth node (114) in the communications network (10).

Example 41: The third node (113) according to any of examples 32-41, wherein the communications network (10) is configured to operate on a Lightweight Machine to Machine, LwM2M, technology.

Example 42: A second node (112) configured to operate in a communications network (10), the second node (112) being further configured to:

facilitate the sending of a first message to a first node (111) configured to operate in the communications network (10), the first message being configured to indicate a capability of the second node (112) or a fourth node (114) configured to operate in the communications network (10) to keep custody of fourth messages configured to be to be sent from the first node (111) to a third node (113) configured to operate in the communications network (10), receive, after having facilitated the sending of the first message, a fourth message from the first node (111), the fourth message being configured to be addressed to the third node (113), and wherein the second node (112) is further configured to handle the fourth message based on the capability configured to be indicated, wherein:

a) with the proviso that the second node (112) is configured to have the capability to keep custody of the fourth messages, the second node (112) is further configured to:

i. create an electronic fingerprint uniquely identifying the received fourth message, and ii. send a third indication of the electronic fingerprint configured to be created to the third node (113).

b) with the proviso that the fourth node (114) is configured to have the capability to keep custody of the fourth messages, the second node (112) is further configured to:

i. forward the fourth message configured to be received to the fourth node (114).

Example 43: The second node (112) according to example 42, wherein the second node (112) is configured to have the capability to keep custody of the fourth messages, and wherein the second node (112) is further configured to:

forward the fourth message configured to be received to the third node (113), and receive a fifth message from the third node (113), the fifth message being configured to be a request for retransmission of the fourth message from the first node (111), the request being configured to identify the message configured to be forwarded based on the third indication configured to be sent.

Example 44: The second node (112) according to example 43, being further configured to:

store the fourth message configured to be received, and re-send the fourth message to the third node (113), based on the fifth message configured to be received.

Example 45: The second node (112) according to any of examples 42-44, being further configured to:

send an indication to the first node (111) acknowledging receipt of the fourth message by the second node (112).

Example 46: The second node (112) according to any of examples 42-45, wherein the second node (112) is further configured to receive, from the first node (111), a second indication of a priority of the fourth message configured to be received, and wherein to create the electronic fingerprint is configured to be further based on the priority configured to be indicated.

Example 47: The second node (112) according to any of examples 42-46, wherein to receive is further configured to comprise receiving a plurality of fourth messages, wherein to create is further configured to comprise creating a plurality of electronic fingerprints, each of the electronic fingerprints in the plurality being configured to uniquely identify a respective message in the plurality of fourth messages configured to be received, and wherein the third indication is configured to indicate the plurality of respective electronic fingerprints configured to be created.

Example 48: The second node (112) according to example 47, wherein the third indication is configured to comprise a respective third indication for each of the respective electronic fingerprints configured to be created.

Example 49: The second node (112) according to according to any of examples 42-48, wherein the second node (112) is configured to be one of: a radio network node (150) serving the device (120), and a fourth node (114) in the communications network (10), the third node (113) is configured to be a network node (120) in the cloud (140), and the first node (111) is configured to be a device (120).

Example 50: The second node (112) according to any of examples 42-49, wherein the communications network (10) operates on a Lightweight Machine to Machine, LwM2M, technology.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method performed by a first node, the first node operating in a communications network, the method comprising:

receiving a first message from a second node operating in the communications network, the first message indicating a capability of the second node or a fourth node operating in the communications network to keep custody of a fourth message to be sent from the first node to a third node operating in the communications network;

receiving a third message from the third node, the third message indicating that the third node supports the second node and/or the fourth node keeping custody of the fourth message;

receiving, from the second node, an indication acknowledging receipt, by the second node or the fourth node, of the fourth message sent by the first node to the third node; and responsive to receiving the indication acknowledging receipt, refraining, before going into sleep mode, from waiting to receive from the third node one of:

an acknowledgement of receipt of the fourth message, and a request for retransmission of the fourth message.

2. The method of claim 1, further comprising:

transmitting, based on the first message, a second message to the third node, the second message comprising a first indication indicating the capability of the second node or the fourth node to have custody of the fourth message to be sent from the first node to the third node, wherein receiving the third message comprises receiving, in response to the second message, the third message.

3. The method of claim 1, further comprising:

transmitting, after receipt of the third message indicating that the third node supports the indicated custody service, the fourth message to the third node via the second node or the fourth node.

4. The method of claim 3, further comprising:

transmitting, to the second node, a second indication of a priority of the fourth message.

5. The method of claim 1, wherein receiving the indication acknowledging receipt comprises receiving, from the second node, the indication acknowledging receipt by the fourth node of the message sent by the first node to the third node.

6. The method of claim 1, further comprising:
transmitting the message to the third node via the second node or via the fourth node,
wherein receiving the indication acknowledging receipt comprises receiving an indication that the second node or the fourth node has or will forward the message to the third node.

7. A first node configured to operate in a communications network, the first node comprising: processing circuitry; and
memory coupled to the processing circuitry and having instructions stored therein that are executable by the processing circuitry to cause the first node to perform operations comprising:
transmitting a second message to a third node configured to operate in the communications network, the second message including a first indication indicating a capability of a second node configured to operate in the communications network and/or a fourth node configured to operate in the communications network to have custody of the fourth message;
transmitting a fourth message to the third node via the second node or via the fourth node;
receiving, from the second node, an indication configured to acknowledge receipt, by the second node or the fourth node, of the fourth message and indicating that the second node or the fourth node has or will forward the fourth message to the third node; and
responsive to receiving the indication, refraining, before going into sleep mode, from waiting to receive from the third node one of:
an acknowledgement of receipt of the fourth message, and
a request for retransmission of the fourth message.

8. The first node of claim 7, wherein refraining from waiting comprises refraining from waiting to receive from the third node the acknowledgement of receipt of the fourth message.

9. The first node of claim 7, wherein refraining from waiting comprises refraining from waiting to receive from the third node the request for retransmission of the fourth message.

10. The first node of claim 7, the operations further comprising:
receiving a first message from the second node, the first message indicating a capability of the second node or the fourth node to keep custody of the fourth message,
wherein transmitting the second message comprises transmitting, based on the first message, the second message to the third node.

11. The first node of claim 7, the operations further comprising:
receiving, in response to the second message, a third message from the third node, the third message indicating whether or not the third node supports the indicated custody service.

12. The first node of claim 11, wherein transmitting the fourth message comprises transmitting, after receipt of the third message indicating that the third node supports the indicated custody service, the fourth message to the third node via the second node or the fourth node.

13. The first node of claim 12, the operations further comprising:

transmitting, to the second node, a second indication of a priority of the fourth message.

14. The first node of claim 7, wherein receiving the indication comprises receiving at least one of:
an indication acknowledging receipt by the fourth node of the fourth message; and
an indication acknowledging receipt by the second node of the fourth message.

15. A non-transitory computer-readable medium having instructions stored therein that are executable by processing circuitry in a first node to cause the first node to perform operations comprising:
transmitting a second message to a third node configured to operate in the communications network, the second message including a first indication indicating a capability of a fourth node configured to operate in the communications network to have custody of fourth messages to be sent from the first node to the third node;
receiving, from a second node configured to operate in the communications network, an indication configured to acknowledge receipt, by the fourth node, of a message configured to be sent by the first node to the third node; and
responsive to receiving the indication, refraining, before going into sleep mode, from waiting to receive from the third node one of:
an acknowledgement of receipt of the message configured to be sent, and
a request for retransmission of the message configured to be sent.

16. The non-transitory computer-readable medium of claim 15, wherein refraining from waiting comprises at least one of:
refraining from waiting to receive from the third node the acknowledgement of receipt of the message configured to be sent; and
refraining from waiting to receive from the third node the request for retransmission of the message configured to be sent.

17. The non-transitory computer-readable medium of claim 15, the operations further comprising:
receiving a first message from the second node, the first message indicating a capability of the fourth node to keep custody of fourth messages to be sent from the first node to the third node,
wherein transmitting the second message comprises transmitting, based on the received first message, the second message to the third node.

18. The non-transitory computer-readable medium of claim 15, the operations further comprising:
receiving, in response to the second message, a third message from the third node, the third message indicating whether or not the third node supports the indicated custody service.

19. The non-transitory computer-readable medium of claim 18, the operations further comprising:
transmitting, after receipt of the third message indicating that the third node supports the indicated custody service, the message to the third node via the fourth node, the message being a fourth message.

20. The non-transitory computer-readable medium of claim 19, the operations further comprising:
transmitting, to the second node, a second indication of a priority of the fourth message.

\* \* \* \* \*